(12) United States Patent
Durst et al.

(10) Patent No.: US 11,155,493 B2
(45) Date of Patent: Oct. 26, 2021

(54) ALLOY OXIDE OVERCOAT INDIUM TIN OXIDE COATINGS, COATED GLAZINGS, AND PRODUCTION METHODS

(71) Applicant: Cardinal CG Company, Eden Prairie, MN (US)

(72) Inventors: Stephen D. Durst, Platteville, WI (US); Gary L. Pfaff, Hillpoint, WI (US)

(73) Assignee: CARDINAL CG COMPANY, Eden Prairie, MN (US)

( * ) Notice: Subject to any disclaimer, the term of this patent is extended or adjusted under 35 U.S.C. 154(b) by 0 days.

(21) Appl. No.: 16/740,006

(22) Filed: Jan. 10, 2020

(65) Prior Publication Data

US 2020/0148587 A1 May 14, 2020

Related U.S. Application Data

(63) Continuation-in-part of application No. 15/827,632, filed on Nov. 30, 2017, now abandoned, which is a
(Continued)

(51) Int. Cl.
*C03C 17/34* (2006.01)
*E06B 3/67* (2006.01)
(Continued)

(52) U.S. Cl.
CPC ...... *C03C 17/3411* (2013.01); *C03C 17/3417* (2013.01); *C03C 17/3435* (2013.01);
(Continued)

(58) Field of Classification Search
CPC ............. C03C 17/3411; C03C 17/3417; C03C 17/3435; C03C 2217/94; C03C 2217/231;
(Continued)

(56) References Cited

U.S. PATENT DOCUMENTS 3,192,575 A 7/1965 Rosenau, Jr. et al.
3,601,375 A 8/1971 Bowman
(Continued)

FOREIGN PATENT DOCUMENTS

EP 1765740 A1 3/2007
EP 2995595 A1 3/2016
(Continued)

OTHER PUBLICATIONS

Burrows et al., U.S. Appl. No. 14/934,664 entitled "Insulating Glass Unit Transparent Conductive Coating Technology," filed Nov. 6, 2015, published as U.S. Publication No. 2016/0060949 on Mar. 3, 2016, and issued as U.S. Pat. No. 10,000,965 on Jun. 19, 2018, 42 pages.
(Continued)

*Primary Examiner* — Donald J Loney
(74) *Attorney, Agent, or Firm* — Fredrikson & Byron, P.A.

(57) ABSTRACT

The invention provides transparent conductive coatings based on indium tin oxide. The coating has an oxide overcoat, such as an alloy oxide overcoat. In some embodiments, the coating further includes one or more overcoat films comprising silicon nitride, silicon oxynitride, silicon dioxide, or titanium dioxide.

38 Claims, 9 Drawing Sheets

Related U.S. Application Data continuation of application No. 14/807,624, filed on Jul. 23, 2015, now Pat. No. 9,862,640, which is a continuation-in-part of application No. 14/185,287, filed on Feb. 20, 2014, now Pat. No. 9,453,365, which is a continuation of application No. 13/006,992, filed on Jan. 14, 2011, now Pat. No. 8,658,262.

(60) Provisional application No. 61/295,694, filed on Jan. 16, 2010.

(51) Int. Cl.
  *B32B 7/025* (2019.01)
  *B32B 17/10* (2006.01)

(52) U.S. Cl.
  CPC ............ *E06B 3/6715* (2013.01); *B32B 7/025* (2019.01); *B32B 17/10174* (2013.01); *B32B 17/10211* (2013.01); *C03C 2217/231* (2013.01); *C03C 2217/94* (2013.01); *C03C 2217/948* (2013.01); *Y10T 428/24975* (2015.01)

(58) Field of Classification Search
  CPC ............ C03C 2217/948; E06B 3/6715; E06B 3/6612; E06B 3/66; Y02A 30/249; Y02B 80/22; B32B 7/00; B32B 7/02; B32B 7/025; B32B 17/10211; B32B 17/10174
  See application file for complete search history.

(56) References Cited

U.S. PATENT DOCUMENTS

| | | | |
|---|---|---|---|
| 3,655,545 A | 4/1972 | Gillery et al. |
| 4,047,351 A | 9/1977 | Derner et al. |
| 4,065,600 A | 12/1977 | King et al. |
| 4,144,684 A | 3/1979 | Kirkbride et al. |
| 4,399,015 A | 8/1983 | Endo et al. |
| 4,407,709 A | 10/1983 | Enjouji et al. |
| 4,490,227 A | 12/1984 | Bitter |
| 4,504,109 A | 3/1985 | Taga et al. |
| 4,583,815 A | 4/1986 | Taga et al. |
| RE32,497 E | 9/1987 | Canfield |
| 4,799,745 A | 1/1989 | Meyer et al. |
| 4,883,721 A | 11/1989 | Nalepka et al. |
| 4,941,302 A | 7/1990 | Barry |
| 5,011,585 A | 4/1991 | Brochot et al. |
| H975 H | 11/1991 | Selkowitz et al. |
| 5,122,180 A | 6/1992 | Mathivat et al. |
| 5,135,581 A | 8/1992 | Tran et al. |
| 5,225,273 A | 7/1993 | Mikoshiba et al. |
| 5,242,560 A | 9/1993 | Lingle et al. |
| 5,279,722 A | 1/1994 | Szczyrbowski et al. |
| 5,352,504 A | 10/1994 | Boulanger et al. |
| 5,376,455 A | 12/1994 | Hartig et al. |
| 5,387,433 A | 2/1995 | Balian et al. |
| 5,425,861 A | 6/1995 | Hartig et al. |
| 5,543,229 A | 8/1996 | Ohsaki et al. |
| 5,552,180 A | 9/1996 | Finley et al. |
| 5,584,902 A | 12/1996 | Hartig et al. |
| 5,630,918 A | 5/1997 | Takahara et al. |
| 5,657,149 A | 8/1997 | Buffat et al. |
| 5,663,829 A | 9/1997 | Lefrou et al. |
| 5,677,240 A | 10/1997 | Murakami et al. |
| 5,709,930 A | 1/1998 | Depauw |
| 5,770,321 A | 6/1998 | Hartig et al. |
| 5,793,518 A | 8/1998 | Lefrou et al. |
| 5,827,409 A | 10/1998 | Iwata et al. |
| 5,830,252 A | 11/1998 | Finley et al. |
| 5,873,203 A | 2/1999 | Thiel |
| 5,889,608 A | 3/1999 | Buffat et al. |
| 6,024,084 A | 2/2000 | Gerhardinger |
| 6,045,896 A | 4/2000 | Boire et al. |
| 6,114,043 A | 9/2000 | Joret |
| 6,121,178 A | 9/2000 | Eshima et al. |
| 6,148,563 A | 11/2000 | Roche et al. |
| 6,159,607 A | 12/2000 | Hartig et al. |
| 6,180,247 B1 | 1/2001 | Szczyrbowski et al. |
| 6,218,018 B1 | 4/2001 | McKown et al. |
| 6,221,520 B1 | 4/2001 | Takaki et al. |
| 6,315,874 B1 | 11/2001 | Suzuki et al. |
| 6,318,027 B1 | 11/2001 | Richardson et al. |
| 6,329,044 B1 | 12/2001 | Inoue et al. |
| 6,340,529 B1 | 1/2002 | Ebisawa et al. |
| 6,379,508 B1 | 4/2002 | Kobayashi et al. |
| 6,383,345 B1 | 5/2002 | Kim et al. |
| 6,416,890 B1 | 7/2002 | Terneu et al. |
| 6,425,990 B1 | 7/2002 | Ishibashi |
| 6,468,403 B1 | 10/2002 | Shimizu et al. |
| 6,472,072 B1 | 10/2002 | Ebisawa et al. |
| 6,475,354 B1 | 11/2002 | Toyama |
| 6,495,251 B1 | 12/2002 | Arbab et al. |
| 6,551,715 B1 | 4/2003 | Seto et al. |
| 6,562,490 B2 | 5/2003 | Ebisawa et al. |
| 6,610,410 B2 | 8/2003 | Ebisawa et al. |
| 6,617,056 B1 | 9/2003 | Hara et al. |
| 6,623,846 B2 | 9/2003 | Laird |
| 6,632,491 B1 | 10/2003 | Thomsen et al. |
| 6,650,478 B1 | 11/2003 | DeBusk et al. |
| 6,656,523 B2 | 12/2003 | Russo et al. |
| 6,677,063 B2 | 1/2004 | Finley |
| 6,699,585 B2 | 3/2004 | Ebisawa et al. |
| 6,733,889 B2 | 5/2004 | Varanasi et al. |
| 6,740,211 B2 | 5/2004 | Thomsen et al. |
| 6,743,488 B2 | 6/2004 | Memarian et al. |
| 6,783,861 B2 | 8/2004 | Ebisawa et al. |
| 6,793,980 B2 | 9/2004 | Ohtsu et al. |
| 6,808,606 B2 | 10/2004 | Thomsen et al. |
| 6,849,165 B2 | 2/2005 | Kloppel et al. |
| 6,924,037 B1 | 8/2005 | Joret et al. |
| 6,942,923 B2 | 9/2005 | Stachowiak |
| 7,041,588 B2 | 5/2006 | Bender |
| 7,081,302 B2 | 7/2006 | Lemmer et al. |
| 7,083,857 B2 | 8/2006 | Sawada et al. |
| 7,153,579 B2 | 12/2006 | Kriltz et al. |
| 7,166,360 B2 | 1/2007 | Coustet et al. |
| 7,258,757 B2 | 8/2007 | Huang et al. |
| 7,265,807 B2 | 9/2007 | Lifka et al. |
| 7,291,816 B2 | 11/2007 | Chen |
| 7,294,404 B2 | 11/2007 | Krisko et al. |
| 7,335,421 B2 | 2/2008 | Thiel et al. |
| 7,339,728 B2 | 3/2008 | Hartig |
| 7,342,716 B2 | 3/2008 | Hartig |
| 7,527,868 B2 | 5/2009 | Grimal et al. |
| 7,534,496 B2 | 5/2009 | Lemmer et al. |
| 7,550,067 B2 | 6/2009 | Veerasamy |
| 7,563,514 B2 | 7/2009 | Nakayama et al. |
| 7,566,481 B2 | 7/2009 | Veerasamy |
| 7,572,509 B2 | 8/2009 | Hartig |
| 7,572,510 B2 | 8/2009 | Hartig |
| 7,572,511 B2 | 8/2009 | Hartig |
| 7,582,356 B2 | 9/2009 | Brochot et al. |
| 7,597,962 B2 | 10/2009 | Butz et al. |
| 7,597,964 B2 | 10/2009 | Krasnov |
| 7,604,865 B2 | 10/2009 | Krisko et al. |
| 7,641,818 B2 | 1/2010 | Nakayama et al. |
| 7,713,632 B2 | 5/2010 | Krisko et al. |
| 7,820,296 B2 | 10/2010 | Myli et al. |
| 7,820,309 B2 | 10/2010 | Myli et al. |
| 7,862,910 B2 | 1/2011 | Krisko et al. |
| 7,964,788 B2 | 6/2011 | Boer et al. |
| 8,286,395 B2 | 10/2012 | Mauvernay et al. |
| 8,298,380 B2 | 10/2012 | Krasnov |
| 8,304,045 B2 | 11/2012 | Lemmer et al. |
| 8,337,988 B2 | 12/2012 | Knoll et al. |
| 8,524,337 B2 | 9/2013 | Lemmer et al. |
| 8,557,642 B2 | 10/2013 | Schroder et al. |
| 8,815,059 B2 | 8/2014 | McLean et al. |
| 8,834,976 B2 | 9/2014 | Lemmer et al. |
| 8,871,349 B2 | 10/2014 | Lemmer et al. |
| 8,939,606 B2 | 1/2015 | Maikowski et al. |
| 9,011,649 B2 | 4/2015 | Kharchenko et al. |
| 9,028,956 B2 | 5/2015 | Knoll et al. |

(56) References Cited

U.S. PATENT DOCUMENTS

| | | | |
|---|---|---|---|
| 9,052,456 B2 | 6/2015 | Hassan et al. | |
| 9,199,875 B2 | 12/2015 | Lemmer et al. | |
| 9,266,773 B2 | 2/2016 | Lemmer et al. | |
| 9,862,640 B2 | 1/2018 | Pfaff et al. | |
| 2001/0016253 A1 | 8/2001 | Goda et al. | |
| 2001/0044032 A1 | 11/2001 | Finley et al. | |
| 2002/0009601 A1 | 1/2002 | Stachowiak | |
| 2002/0021495 A1 | 2/2002 | Lingle | |
| 2002/0071903 A1 | 6/2002 | Lee et al. | |
| 2003/0003304 A1 | 1/2003 | Ohtsu et al. | |
| 2003/0155790 A1 | 8/2003 | Noguchi et al. | |
| 2003/0190476 A1 | 10/2003 | Veerasamy et al. | |
| 2003/0198808 A1 | 10/2003 | Muromachi et al. | |
| 2004/0004684 A1 | 1/2004 | Yang et al. | |
| 2004/0028953 A1 | 2/2004 | Kraemling | |
| 2004/0137235 A1* | 7/2004 | Paul | C03C 17/36 |
| | | | 428/432 |
| 2004/0147139 A1 | 7/2004 | Jiang | |
| 2005/0000794 A1 | 1/2005 | Demaray et al. | |
| 2005/0008796 A1 | 1/2005 | Kriltz et al. | |
| 2006/0011466 A1 | 1/2006 | Chen | |
| 2006/0050425 A1 | 3/2006 | Muromachi et al. | |
| 2006/0118408 A1 | 6/2006 | Myli et al. | |
| 2006/0121315 A1 | 6/2006 | Myli et al. | |
| 2006/0144695 A1 | 7/2006 | Lee et al. | |
| 2006/0201203 A1 | 9/2006 | Labrousse et al. | |
| 2006/0234064 A1 | 10/2006 | Baubet et al. | |
| 2007/0029186 A1 | 2/2007 | Krasnov et al. | |
| 2007/0081227 A1 | 4/2007 | Hartig | |
| 2007/0082124 A1 | 4/2007 | Hartig | |
| 2007/0082169 A1 | 4/2007 | Hartig | |
| 2007/0082186 A1 | 4/2007 | Hartig | |
| 2007/0137999 A1 | 6/2007 | Delrue et al. | |
| 2007/0240977 A1 | 10/2007 | Krempel-Hesse et al. | |
| 2007/0241364 A1 | 10/2007 | Akao et al. | |
| 2008/0160321 A1 | 7/2008 | Padiyath et al. | |
| 2008/0261035 A1 | 10/2008 | Grimal et al. | |
| 2008/0292872 A1 | 11/2008 | Boire et al. | |
| 2009/0020414 A1 | 1/2009 | Tsao et al. | |
| 2009/0047509 A1 | 2/2009 | Gagliardi et al. | |
| 2009/0075069 A1* | 3/2009 | Myli | C23C 14/024 |
| | | | 428/336 |
| 2009/0084438 A1 | 4/2009 | Boer et al. | |
| 2009/0135319 A1 | 5/2009 | Veerasamy | |
| 2009/0169846 A1 | 7/2009 | Siddle et al. | |
| 2009/0214880 A1 | 8/2009 | Lemmer | |
| 2009/0229856 A1 | 9/2009 | Fredenberg et al. | |
| 2009/0297886 A1 | 12/2009 | Gessert et al. | |
| 2009/0320824 A1 | 12/2009 | Henn et al. | |
| 2010/0035030 A1 | 2/2010 | Huang et al. | |
| 2010/0062245 A1 | 3/2010 | Martin et al. | |
| 2010/0071810 A1 | 3/2010 | Nadaud et al. | |
| 2011/0146785 A1 | 6/2011 | Buller et al. | |
| 2011/0171365 A1 | 7/2011 | Kuroda | |
| 2011/0180130 A1 | 7/2011 | Krasnov et al. | |
| 2011/0210656 A1 | 9/2011 | Lemmer et al. | |
| 2011/0212279 A1 | 9/2011 | Lemmer et al. | |
| 2011/0212311 A1 | 9/2011 | Lemmer et al. | |
| 2011/0216389 A1 | 9/2011 | Piroux et al. | |
| 2012/0021149 A1 | 1/2012 | Myli et al. | |
| 2012/0048722 A1 | 3/2012 | McLean et al. | |
| 2012/0087005 A1 | 4/2012 | Reymond et al. | |
| 2012/0094075 A1 | 4/2012 | Peter et al. | |
| 2012/0164420 A1 | 6/2012 | Lemmer et al. | |
| 2013/0095292 A1 | 4/2013 | Pfaff et al. | |
| 2013/0114133 A1 | 5/2013 | Sarto et al. | |
| 2014/0010976 A1 | 1/2014 | Gerardin et al. | |
| 2014/0154434 A1 | 6/2014 | Nunez-Regueiro et al. | |
| 2014/0176836 A1 | 6/2014 | Brecht et al. | |
| 2014/0237917 A1 | 8/2014 | Theios et al. | |
| 2014/0314972 A1 | 10/2014 | Myli et al. | |
| 2014/0334805 A1 | 11/2014 | McLEAN et al. | |
| 2015/0004369 A1 | 1/2015 | Eby et al. | |
| 2015/0070755 A1 | 3/2015 | Singh et al. | |
| 2015/0124447 A1 | 5/2015 | Maikowski et al. | |
| 2015/0146286 A1 | 5/2015 | Hagen et al. | |
| 2016/0002098 A1 | 1/2016 | Sternchuss et al. | |
| 2016/0002100 A1 | 1/2016 | Melcher et al. | |
| 2016/0229741 A1 | 8/2016 | Canova et al. | |
| 2017/0043554 A1 | 2/2017 | Fujino et al. | |
| 2018/0237899 A1 | 8/2018 | Lu et al. | |
| 2018/0312428 A1 | 11/2018 | Vandal et al. | |
| 2020/0131084 A1 | 4/2020 | Myli et al. | |

FOREIGN PATENT DOCUMENTS

| | | |
|---|---|---|
| GB | 718189 A | 11/1954 |
| GB | 1498142 A | 1/1978 |
| JP | H11-262968 A | 9/1999 |
| WO | 92017412 A1 | 10/1992 |
| WO | 33093185 A1 | 11/2003 |
| WO | 2009036284 A1 | 3/2009 |
| WO | 2010115558 A1 | 10/2010 |
| WO | 2010136788 A1 | 12/2010 |
| WO | 2011039488 A1 | 4/2011 |
| WO | 2011105991 A1 | 9/2011 |
| WO | 2012078395 A2 | 6/2012 |
| WO | 2015055944 A1 | 4/2015 |
| WO | 2015197969 A1 | 12/2015 |
| WO | 2017078909 A1 | 5/2017 |

OTHER PUBLICATIONS

Burrows et al., U.S. Appl. No. 14/934,686 entitled "Insulating Glass Unit Transparent Conductivity and Low Emissivity Coating Technology," filed Nov. 6, 2015, published as U.S. Publication No. 2016/0060948 on Mar. 3, 2016, and issued as U.S. Pat. No. 10,000,411, on Jun. 19, 2018, 43 pages.

Burrows et al., U.S. Appl. No. 14/934,706 entitled "Flash-Treated Indium Tin Oxide Coatings, Production Methods, and Insulating Glass Unit Transparent Conductive Coating Technology," filed Nov. 6, 2015, published as US Publication No. 2016/0060163 on Mar. 3, 2016, and Bsued as U.S. Pat. No. 10,060,180 on Aug. 28, 2018, 45 pages.

Chaudhuri et al., "Microstructure of indium tin oxide films produced by the D C. sputtering technique," Thin Solid Films, vol. 148, No. 3, Apr. 1987, pp. 279-284.

Davis, "Properties of transparent conducting oxides deposited at room temperature," Thin Solid Films, vol. 236, No. 1-2, Dec. 15, 1993, pp. 1-5.

Gordon, "Criteria for Choosing Transparent Conductors," MRS Bulletin, Aug. 2000, pp. 52-57.

International Pat. App. No PCT/US2016/039979, International Search Report and Written Opinion dated Sep. 13, 2016, 11 pages.

Junghahnel et al., "p. 65: Advanced processing of ITO and IZO thin films on flexible glass," Society for Information Display, vol. 46, No. 1, May 21-Jun. 5, 2015, pp. 1378-1381.

Mitsui et al., "Optical and Electrical Properties of SiO2-Overcoated ITO Films for Automotive Windows," Asahi Glass Research Reports, Asahi Glass Co., Ltd., vol. 54, 2004, pp. 11-15.

Myli et al., U.S. Appl. No. 13/006,992 entitled "High Quality Emission Control Coatings, Emission Control Glazings, and Production Methods," filed Jan. 14, 2011, and issued as U.S. Pat. No. 8,658,262 on Feb. 25, 2014, 33 pages.

Myli et al., U.S. Appl. No. 14/185,287 entitled "High Quality Emission Control Coatings, Emission Control Glazings, and Production Methods," filed Feb. 20, 2014, and issued as U.S. Pat. No. 9,453,365 on Sep. 27, 2016, 33 pages.

Pfaff et al., U.S. Appl. No. 14/807,624 entitled "Tin Oxide Overcoat Indium Tin Oxide Coatings, Coated Glazings, and Production Methods," filed Jul. 23, 2015, 37 pages, published as U.S. Publication No. 2015-0329417 on Nov. 19, 2015, and issued as U.S. Pat. No. 9,862,640 on Jan. 9, 2018, dentified hereby as being a related application.

Pfaff et al., US Pat. U.S. Appl. No. 14/807,624, Non-Final Office Action dated Jun. 2, 2017, 9 pages.

Ofaff et al., U.S. Appl. No. 14/807,624, Response to Non-Final Office Action dated Jun. 2, 2017, filed Sep. 8, 2017, 16 pages.

(56) References Cited

OTHER PUBLICATIONS

Pfaff et al., U.S. Appl. No. 14/807,624, Notice of Allowance dated Nov. 29, 2017, 7 pages.
Pfaff et al., U.S. Appl. No. 15/827,632 entitled "Tin Oxide Overcoat Indium Tin Oxide Coatings, Coated Glazings, and Production Methods," filed Nov. 30, 2017, 33 pages, published as U.S. Publication No. 2018-0079681 on Mar. 22, 2018, and identified hereby as being a related application.
Pfaff et al., U.S. Appl. No. 15/827,632, Non-Final Office Action dated Jul. 11, 2019, 13 pages.
Pfaff et al., U.S. Appl. No. 15/827,632, Notice of Abandonment dated Feb. 6, 2020,2 pages.
Sebastien et al., International Patent Application No. PCT/FR2015/051671, entitled Anti-Condensation Blazing Unit, filed Jun. 23, 2015, English Machine Translation, 19 pages.
Myli et al., U.S. Appl. No. 13/006,992, Restriction Requirement dated Mar. 14, 2013, 6 pages.
Myli et al., U.S. Appl. No. 13/006,992, Response to Restriction Requirement dated Mar. 14, 2013, filed Mar. 25, 2013, 2 pages.
Myli et al., U.S. Appl. No. 13/006,992, Non-Final Office Action dated Jun. 21, 2013, 7 pages.
Myli et al., U.S. Appl. No. 13/006,992, Response to Non-Final Office Action dated Jun. 21, 2013, filed Dec. 19, 2013, 9 pages.
Myli et al., U.S. Appl. No. 13/006,992, Notice of Allowance dated Jan. 10, 2014, 8 pages.
Myli et al., U.S. Appl. No. 14/185,287, Non-Final Office Action dated Mar. 25, 2016, 9 pages.
Myli et al., U.S. Appl. No. 14/185,287, Response to Non-Final Office Action dated Mar. 25, 2016, filed Jun. 9, 2016, 10 pages.
Myli et al., U.S. Appl. No. 14/185,287, Notice of Allowance dated Jul. 13, 2016, 5 pages.
Pre-Filing Activity Disclosure Form for disclosures believed to have occurred more than one year prior to filing the nstant application, Cardinal CG Company, 3 pgs.
U.S. Appl. No. 16/176,769, "Low Solar Heat Gain Coatings, Laminated Glass Assemblies, and Methods of Producing Same," filed 2018-10-31,43 pages, now published as U.S. Publication No. 2020-0131084 on 2020-04-30, and identified hereby as being a related application.
Pfaff et al., U.S. Appl. No. 14/807,624, Non-Final Office Action dated Jun. 2, 2017, 9 pages.
Pfaff et al., U.S. Appl. No. 14/807,624, Response to Non-Final Office Action dated Jun. 2, 2017, filed Sep. 8, 2017, 16 pages.
Pat. App. No. PCT/US2020/067452, International Search Report and Written Opinion dated Apr. 21, 2021, 11 pages.

\* cited by examiner

ALLOY OXIDE OVERCOAT INDIUM TIN OXIDE COATINGS, COATED GLAZINGS, AND PRODUCTION METHODS

CROSS REFERENCE TO RELATED APPLICATIONS

The present application is a continuation-in-part of and claims priority to U.S. patent application Ser. No. 15/827,632, filed on Nov. 30, 2017, which is a continuation of U.S. patent application Ser. No. 14/807,624, filed on Jul. 23, 2015 and now issued as U.S. Pat. No. 9,862,640, which is a continuation-in-part of U.S. patent application Ser. No. 14/185,287, filed on Feb. 20, 2014 and now issued as U.S. Pat. No. 9,453,365, which is a continuation of U.S. patent application Ser. No. 13/006,992, filed on Jan. 14, 2011 and now issued as U.S. Pat. No. 8,658,262; and U.S. Provisional Patent Application No. 61/295,694, filed on Jan. 16, 2010, the contents of each of which are hereby incorporated by reference into this application.

FIELD OF THE INVENTION

The present invention relates to thin film coatings for glass and other substrates. In particular, this invention relates to transparent electrically conductive coatings based on indium tin oxide. Also provided are methods and equipment for producing such coatings and glazing assemblies.

BACKGROUND OF THE INVENTION

A variety of transparent electrically conductive oxide (TCO) coatings are known in the art. Commonly, these coatings include an indium tin oxide film. In some cases, the indium tin oxide film is located beneath one or more overcoat films of silicon nitride, silicon oxynitride, or silicon dioxide. It would be desirable to provide an overcoat film that: (i) has a composition different from that of the TCO film, and yet (ii) contains one or more metals also found in the TCO film. It would be particularly desirable to provide an overcoat film of this nature that provides the coating with good durability and adheres well to indium tin oxide film and/or any other overcoat films, such as one or more overcoat films of silicon nitride, silicon oxynitride, or silicon dioxide. In such cases, it would be desirable for the coating and its films to have compositions and thicknesses that simultaneously achieve low sheet resistance and high visible transmission, preferably together with neutral color properties.

BRIEF SUMMARY OF THE INVENTION

Certain embodiments of the invention provide a multiple-pane insulating glazing unit having a between-pane space and two opposed external pane surfaces. A desired one of the two external pane surfaces bears a coating comprising both an indium tin oxide film and a tin oxide film. The tin oxide film is located over the indium tin oxide film.

In some embodiments, the invention provides a coated pane comprising a glass substrate and a coating on the glass substrate. The coating comprises both an indium tin oxide film and a tin oxide film. The tin oxide film is located further from the glass pane than is the indium tin oxide film. In the present embodiments, the indium tin oxide film has a thickness of between 100 Å and 2,000 Å, while the tin oxide film has a thickness of between 90 Å and 1,200 Å. Preferably, the indium tin oxide film has a sheet resistance of less than 20 ohms/square, while the coated pane has a visible transmission of greater than 75%.

Some embodiments provide a multiple-pane insulating glazing unit having a between-pane space and two opposed external pane surfaces. A desired one of the two external pane surfaces bears a coating comprising both an indium tin oxide film and a tin oxide film. The tin oxide film is located over the indium tin oxide film. In the present embodiments, the indium tin oxide film has a sheet resistance of less than 20 ohms/square and a thickness of between 1,000 Å and 1,600 Å. Preferably, the tin oxide film has a thickness of between 90 Å and 1,200 Å, and is devoid of indium oxide. In the present embodiments, the multiple-pane insulating glazing unit includes an internal pane surface bearing a low-emissivity coating that has only one film comprising silver. The film comprising silver contains at least 50% silver by weight. The low-emissivity coating is exposed to the between-pane space. The multiple-pane insulating glazing unit has a U value of less than 0.25 together with a visible transmission of greater than 75%, and the multiple-pane insulating glazing unit exhibits an exterior reflected color characterized by an "$a_h$" color coordinate of between −6 and 0 and a "$b_h$" color coordinate of between −8 and −1.

Certain embodiments provide a multiple-pane insulating glazing unit having a between-pane space and two opposed external pane surfaces. A desired one of the two external pane surfaces bears a coating comprising both an indium tin oxide film and a tin oxide film. The tin oxide film is located over the indium tin oxide film. In the present embodiments, the indium tin oxide film has a sheet resistance of less than 20 ohms/square, and a thickness of between 1,000 Å and 1,600 Å. Preferably, the tin oxide film has a thickness of between 90 Å and 1,200 Å, and is devoid of indium oxide. In the present embodiments, the multiple-pane insulating glazing unit includes an internal pane surface bearing a low-emissivity coating that has only two films comprising silver. Each of the two films comprising silver contains at least 50% silver by weight. The low-emissivity coating is exposed to the between-pane space. The multiple-pane insulating glazing unit has a U value of less than 0.25 together with a visible transmission of greater than 65%, and the multiple-pane insulating glazing unit exhibits an exterior reflected color characterized by an "$a_h$" color coordinate of between −6 and 0 and a "$b_h$" color coordinate of between −8 and −1.

Further, some embodiments provide a multiple-pane insulating glazing unit having a between-pane space and two opposed external pane surfaces. A desired one of the two external pane surfaces bears a coating comprising both an indium tin oxide film and a tin oxide film. The tin oxide film is located over the indium tin oxide film. In the present embodiments, the indium tin oxide film has a sheet resistance of less than 20 ohms/square, and a thickness of between 1,000 Å and 1,600 Å. Preferably, the tin oxide film has a thickness of between 90 Å and 1,200 Å, and is devoid of indium oxide. In the present embodiments, the multiple-pane insulating glazing unit includes an internal pane surface bearing a low-emissivity coating that includes three films comprising silver. Each of the films comprising silver contains at least 50% silver by weight. The low-emissivity coating is exposed to the between-pane space. The multiple-pane insulating glazing unit has a U value of less than 0.25 together with a visible transmission of greater than 60%, and the multiple-pane insulating glazing unit exhibits an exterior reflected color characterized by an "$a_h$" color coordinate of between −6 and 1 and a "$b_h$" color coordinate of between −7 and −1.

Still further, certain embodiments provide a coated pane comprising a glass substrate and a coating on the glass substrate. The coating includes both an indium tin oxide film and a tin oxide film. The tin oxide film is located further from the glass pane than is the indium tin oxide film. In the present embodiments, the coating has an emissivity in the range of from 0.25 to 0.55, and the coated pane has a visible transmission of greater than 75%. Preferably, the indium tin oxide film has a thickness of greater than 100 Å but less than 1,100 Å, and the tin oxide film has a thickness of between 90 Å and 1,200 Å.

Certain other embodiments provide a multiple-pane insulating glazing unit having a between-pane space and two opposed external pane surfaces. A desired one of the two external pane surfaces bears a coating comprising both a first indium tin oxide film and a second indium tin oxide film. The second indium tin oxide film is located over, and preferably is in contact with, the first indium tin oxide film. The first indium tin oxide film is more electrically conductive than the second indium tin oxide film.

Further, certain embodiments provide a multiple-pane insulating glazing unit having a between-pane space and two opposed external pane surfaces. A desired one of the two external pane surfaces bears a coating comprising both an indium tin oxide film and an aluminum tin oxide film. The aluminum tin oxide film is located over, and preferably is in contact with, the indium tin oxide film.

Still further, certain other embodiments provide a multiple-pane insulating glazing unit having a between-pane space and two opposed external pane surfaces. A desired one of the two external pane surfaces bears a coating comprising both an indium tin oxide film and a silicon tin oxide film. The silicon tin oxide film is located over, and preferably is in contact with, the indium tin oxide film.

Still other embodiments provide a multiple-pane insulating glazing unit having a between-pane space and two opposed external pane surfaces. A desired one of the two external pane surfaces bears a coating comprising both an indium tin oxide film and a zinc tin oxide film. The zinc tin oxide film is located over, and preferably is in contact with, the indium tin oxide film. The zinc tin oxide film may be an exposed outermost film of the coating.

DETAILED DESCRIPTION OF PREFERRED EMBODIMENTS

Figure 1:
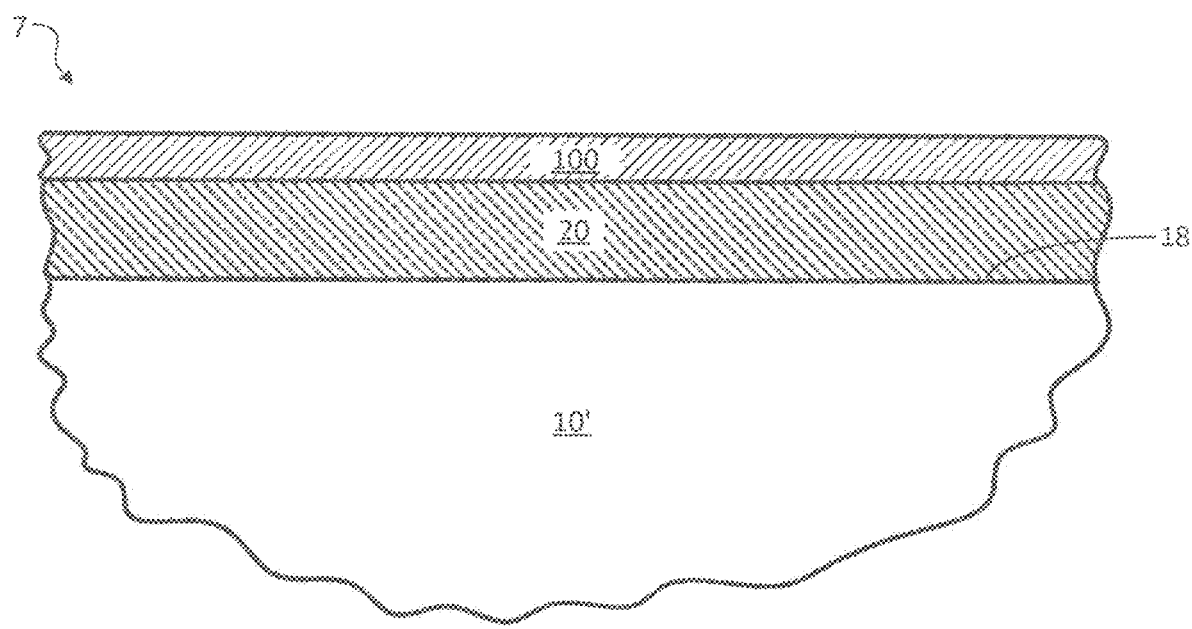
FIG. 1 is a broken-away schematic cross-sectional view of a substrate having a major surface bearing a transparent electrically conductive coating in accordance with certain embodiments of the present invention.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Many embodiments of the invention involve a coated substrate. A wide variety of substrate types are suitable for use in the invention. In some embodiments, the substrate is a sheet-like substrate having generally opposed first and second major surfaces. For example, the substrate can be a sheet of transparent material (i.e., a transparent sheet). The substrate, however, is not required to be a sheet, nor is it required to be transparent.

For many applications, the substrate will comprise a transparent (or at least translucent) material, such as glass or clear plastic. For example, the substrate is a glass sheet (e.g., a window pane) in certain embodiments. A variety of known glass types can be used, such as soda-lime glass. In some cases, it may be desirable to use "white glass," a low iron glass, etc. In certain embodiments, the substrate is part of a window, door, skylight, or other glazing. Depending on the level of solar control desired, the present coating may be applied to tinted glass. Thus, the coating of any embodiment disclosed herein can optionally be provided on a sheet of tinted glass. This may provide particularly good selectivity.

Substrates of various sizes can be used in the present invention. Commonly, large-area substrates are used. Certain embodiments involve a substrate having a major dimension (e.g., a length or width) of at least about 0.5 meter, preferably at least about 1 meter, perhaps more preferably at least about 1.5 meters (e.g., between about 2 meters and about 4 meters), and in some cases at least about 3 meters.

In some embodiments, the substrate is a jumbo glass sheet having a length and/or width that is between about 3 meters and about 10 meters, e.g., a glass sheet having a width of about 3.5 meters and a length of about 6.5 meters. Substrates having a length and/or width of greater than about 10 meters are also anticipated.

Substrates of various thicknesses can be used in the present invention. In some embodiments, the substrate (which can optionally be a glass sheet) has a thickness of about 1-8 mm. Certain embodiments involve a substrate with a thickness of between about 2.3 mm and about 4.8 mm, and perhaps more preferably between about 2.5 mm and about 4.8 mm. In one particular embodiment, a sheet of glass (e.g., soda-lime glass) with a thickness of about 3 mm is used.

The substrate 10' has opposed surfaces 16 and 18, which preferably are opposed major surfaces. In some cases, surface 16 is destined to be an internal surface exposed to a between-pane space of an insulating glazing unit, while surface 18 is destined to be an external surface exposed to an interior of a building. This, however, will not be the case in all embodiments.

Figure 2:
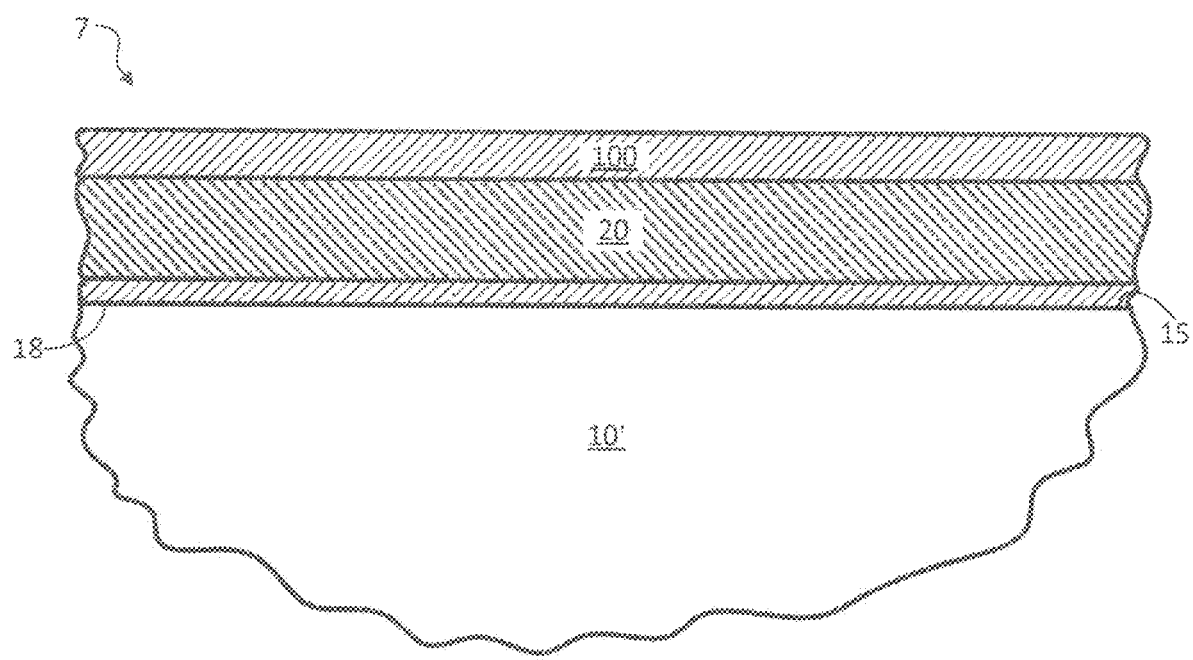
FIG. 2 is a broken-away schematic cross-sectional view of a substrate having a major surface bearing a transparent electrically conductive coating in accordance with other embodiments of the invention.

As shown in FIGS. 1 and 2, the substrate 10' bears a transparent electrically conductive coating 7. In FIG. 1, the coating 7 includes, in sequence from surface 18 outwardly, an indium tin oxide film 20 and a tin oxide film 100. In FIG. 2, the coating 7 includes, from surface 18 outwardly, an optional base film 15, the indium tin oxide film 20, and the tin oxide film 100. The films 15, 20, and 100 can be provided in the form of discrete layers, thicknesses of graded film, or a combination of both including at least one discrete layer and at least one thickness of graded film. While the base film 15 is shown as a single layer, it can alternatively be a plurality of layers. Preferably, all the films in the coating 7 are oxide, nitride, or oxynitride films. In some cases, all the films in the coating 7 are sputtered films.

The coating 7 preferably is formed of materials, and made by a process (as detailed herein), that allows the coated substrate to have a haze level of less than 0.5 or less than 0.3 (e.g., less than 0.2, less than 0.1, or even less than 0.09), a roughness $R_a$ of less than about 10 nm, less than about 5 nm, or less than about 3 nm (e.g., less than about 2 nm), and a monolithic visible transmission of greater than 75% (preferably greater than 80%).

Haze can be measured in well-known fashion, e.g., using a BYK Haze-Gard plus instrument. Reference is made to ASTM D 1003-00: Standard Test method for Haze and Luminous Transmittance of Transparent Plastics, the contents of which are incorporated herein by reference.

In certain embodiments, the coated substrate has a haze of less than 0.3 and a surface roughness of about less than 3 nm, together with a monolithic visible transmission of greater than 70% (e.g., before and after heat treatment), greater than 73% (e.g., before and after heat treatment), greater than 81% (e.g., after heat treatment), greater than 82% (e.g., after heat treatment), or even greater than 85% in some cases (e.g., after heat treatment), in combination with a post-heat $R_{sheet}$ of less than 75 ohms/square, less than 55 ohms/square, less than 30 ohms/square, less than 15 ohms/square, or in some cases even less than 13 ohms/square, such as about 11.5 to 12.5 ohms/square.

The coating 7 also has a low surface roughness. Preferably, the coating 7 has a surface roughness $R_a$ of less than 10 nm, less than 5 nm, less than 3 nm, less than 2.5 nm, less than 2.2 nm, or even less than 2.0 nm, such as about 1.9 nm. The deposition method and conditions preferably are chosen so as to provide the coating with such a roughness. Alternatively, the coating could be polished after deposition to reduce its surface roughness. Preferably, though, the coating exhibits the preferred surface roughness without requiring any polishing or the like (e.g., as-deposited).

Surface roughness is defined in terms deviations from the mean surface level. The surface roughness $R_a$ is the arithmetical mean surface roughness. This is the arithmetic average of the absolute deviations from the mean surface level. The arithmetical mean surface roughness of a coating is commonly represented by the equation: $R_a = 1/L \int_0^L |f(x)| dx$. The surface roughness $R_a$ can be measured in conventional fashion, e.g., using an Atomic Force Microscope (AFM) equipped with conventional software that gives $R_a$.

When provided, the optional base film 15 can comprise, consist essentially of, or consist of silica, alumina, or a mixture of both. In other embodiments, the base film 15 comprises titanium dioxide. In still other embodiments, the base film 15 comprises tin oxide (e.g., $SnO_2$). In such embodiments, the base film 15 may be devoid of indium. For example, a base film 15 consisting of (or at least consisting essentially of) tin oxide is provided in some cases. Combinations of two or more of silica, alumina, titanium dioxide, and tin oxide may be used as well. Alternatively, other dielectric films may be used.

Thus, in certain embodiments, in addition to the indium tin oxide film 20, the coating 7 includes a film 15 comprising tin oxide located under the indium tin oxide film 20 in combination with a tin oxide film 100 located over the indium tin oxide film 20.

The indium tin oxide film 20 comprises indium tin oxide optionally together with one or more other materials. If desired, zinc, aluminum, antimony, fluorine, carbon nanotubes, or other additives can be included in the film. Preferably, the indium tin oxide film 20 consists essentially of, or consists of, indium tin oxide. The indium tin oxide film 20 can contain various relative percentages of indium oxide and tin oxide. Indium oxide is the major constituent. That is, it accounts for more than 50% of the film's total weight. Preferably, the composition of the film ranges from about 75% indium oxide/25% tin oxide to about 95% indium oxide/5% tin oxide, such as about 90% indium oxide/10% tin oxide.

In embodiments where the tin oxide film 100 is provided, it is located over the indium tin oxide film 20. In some cases, the tin oxide film 100 comprises fluorine. Preferably, the tin oxide film 100 is devoid of indium oxide. For example, the tin oxide film 100 may consist of (or at least consist essentially of) tin oxide (e.g., $SnO_2$). In certain embodiments, film 100 contains at least 75% tin oxide, at least 85% tin oxide, or at least 95% tin oxide (based on the total weight of the film), while also being devoid of indium oxide.

In some embodiments, the coating 7 includes a nitride film between the indium tin oxide film 20 and the tin oxide film 100. The nitride film may comprise one or more of silicon nitride, aluminum nitride, and titanium nitride. For example, a thin film of silicon nitride can optionally be positioned directly between (i.e., so as to contact both) the indium tin oxide film and the tin oxide film. When provided, this silicon nitride film (which can optionally include a small amount of aluminum) may have a thickness of less than 250 Å, or even less than 200 Å, e.g., about 150 Å.

In other embodiments, the tin oxide film 100 is in contact with the indium tin oxide film 20. Providing the tin oxide film 100 directly over (i.e., so as to be in contact with) the underlying indium tin oxide film 20 can be advantageous in that, while these two films have different compositions, both contain tin oxide and may provide exceptional adhesion to each other. This film combination may also make the coating particularly smooth, thus creating a coated surface that is easier to clean, remove label residue, etc.

When provided, the optional base film 15 has a thickness of 50 Å or more, such as about 70-300 Å. In certain embodiments, the coating includes a base film of silica (optionally including some aluminum), alumina, titanium dioxide, or tin oxide at a thickness of 75-150 Å.

In other embodiments, the indium tin oxide film 20 is directly on (i.e., in contact with) the substrate surface 18. In these embodiments, there is of course no base film 15. Applicant has found that good results can be achieved in cases where indium tin oxide film is directly on soda-lime float glass.

Preferably, the indium tin oxide film 20 has a thickness of between 100 Å and 2,000 Å. In certain embodiments, the indium tin oxide film 20 has a thickness of less than 1,750 Å, such as between 1,000 Å and 1,600 Å, or even less than 1,500 Å, such as about 1,200-1,400 Å. The thicknesses recited herein are physical thicknesses unless otherwise specified to be optical thicknesses.

The indium tin oxide film 20 preferably has a sheet resistance of less than 55 ohms/square. In certain embodiments, the sheet resistance is less than 20 ohms/square, or even less than 15 ohms/square, such as about 11.5-12.5 ohms/square.

When provided, the tin oxide film 100 can have a thickness of between 90 Å and 1,200 Å. In certain embodiments, the film 100 has a thickness of between 100 Å and 600 Å, such as between 200 Å and 400 Å, e.g., about 350 Å.

Some embodiments provide the thickness of the indium tin oxide film 20 in the range of about 1,100-1,500 Å in combination with the thickness of the tin oxide film 100 being about 100-700 Å. This combination of thicknesses, however, is not required for all embodiments. Rather, this combination of thicknesses is merely used in one group of embodiments. This combination of thicknesses, however, can optionally be provided in any embodiment hereof that includes both film 20 and film 100 (i.e., in any embodiment having any of the noted combinations of other features and properties described herein).

Table 1 below shows four exemplary film stacks that can be used as coating 7 (here, it will be appreciated that the tin oxide film is the outermost film of the coating):

TABLE 1

| FILM | SAMPLE A | SAMPLE B | SAMPLE C | SAMPLE D |
|---|---|---|---|---|
| ITO | 1,325 Å | 1,250 Å | 1,240 Å | 1,350 Å |
| $SnO_2$ | 440 Å | 560 Å | 600 Å | 460 Å |

These film stacks represent a broader group of embodiments wherein the coating 7 has a total thickness of less than 2,400 Å. A base film (e.g., silica at about 100 Å) can optionally be added. Additionally or alternatively, a nitride film (e.g., silicon nitride at about 150 Å) may be added between the ITO and $SnO_2$ films.

Figure 3:
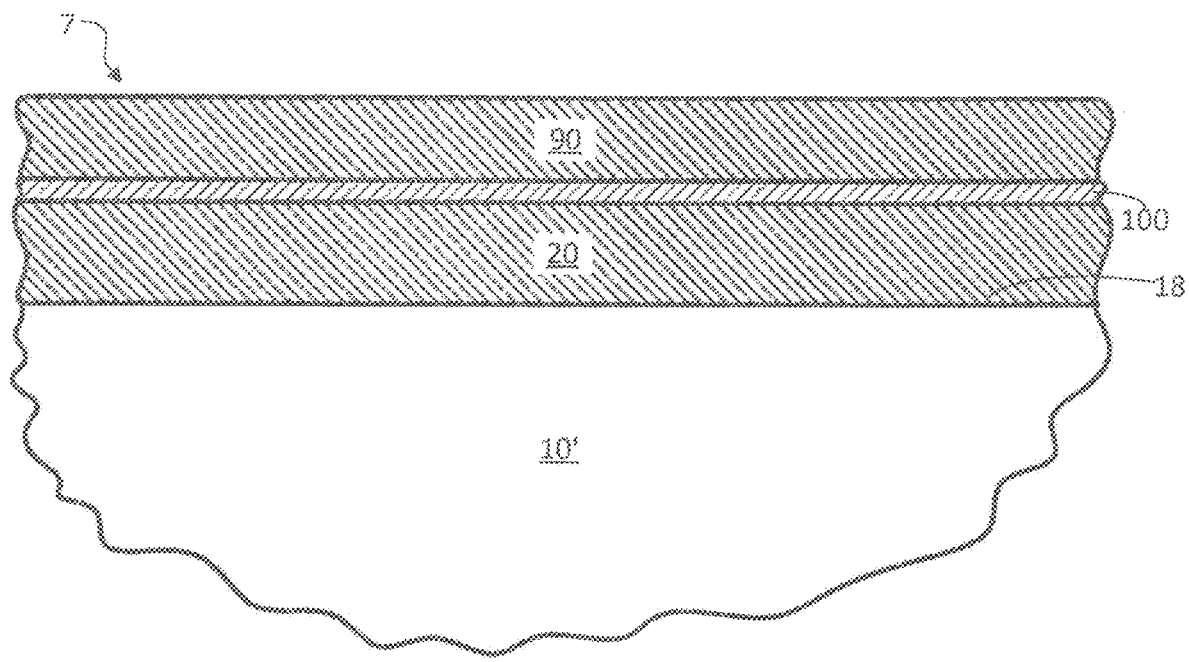
FIG. 3 is a broken-away schematic cross-sectional view of a substrate having a major surface bearing a transparent electrically conductive coating in accordance with still other embodiments of the invention.

The coating 7 can optionally further include an oxynitride film 90 located over the tin oxide film 100. Reference is made to FIG. 3. When provided, the oxynitride film 90 can have a thickness of between 100 Å and 1,300 Å, such as between 400 angstroms and 900 angstroms. The oxynitride film 90 can optionally be directly over (i.e., so as to contact) the tin oxide film 100. The oxynitride film 90 may comprise aluminum, oxygen, and nitrogen. In certain embodiments, the oxynitride film 90 is an exposed outermost film of the coating 7.

In some cases, the oxynitride film 90 comprises silicon oxynitride at a thickness of between 400 Å and 900 Å. The silicon oxynitride may, for example, be sputter deposited from one or more silicon-aluminum targets, such as elemental targets comprising a sputterable material consisting of about 83% silicon and 17% aluminum.

In certain embodiments, the coating 7 includes a film comprising titanium oxide 70. When provided, the film comprising titanium oxide 70 can be located over the tin oxide film 100. Furthermore, when both the optional oxynitride film 90 and the optional film comprising titanium oxide 70 are provided, the film comprising titanium oxide is located over the oxynitride film. In preferred embodiments, the film comprising titanium oxide 70 has a thickness of less than 200 Å, such as from 10-75 Å, e.g., about 50 Å.

Preferably, the film comprising titanium oxide 70 is photocatalytic, hydrophilic, or both. Suitable films are described in U.S. Pat. No. 7,294,404 and Ser. No. 11/129,820 and U.S. Pat. Nos. 7,713,632 and 7,604,865 and Ser. No. 11/293,032 and U.S. Pat. Nos. 7,862,910 and 7,820,309 and 7,820,296, the salient teachings of each of which are incorporated herein by reference.

In some embodiments, the coated substrate 10' is part of a monolithic glazing. In other embodiments, the coated substrate 10' is part of a multi-pane insulating glazing unit ("IG unit") 110.

In one group of embodiments, the coating 7 is on a #4 surface, a #6 surface, or another external surface of the inboard pane of an IG unit 100. By providing the transparent electrically conductive coating 7 on this surface, the temperature of this indoor pane under certain conditions can be decreased. In such cases, by providing a photocatalytic and/or hydrophilic film comprising titanium oxide 70 over the rest of the coating 7, any condensation that may occur on the room-side surface may be more readily formed into a sheet and evaporated.

Thus, certain embodiments provide a coated substrate (e.g., a glass pane) having the following films in sequence moving outwardly from the substrate (though, not necessarily in contiguous sequence): indium tin oxide film/tin oxide film/film comprising titanium oxide, or: indium tin oxide film/tin oxide film/oxynitride film/film comprising titanium oxide. The film comprising titanium oxide can be, for example, a $TiO_2$ film or a film comprising both titanium oxide and tungsten oxide (e.g., about 2.5% W). The film comprising titanium oxide can have a physical thickness of less than 200 Å, or even less than 75 Å, such as about 50 Å. In the present embodiments, the film comprising titanium oxide 70 can be the outermost (i.e., exposed) film of the coating 7.

Referring to the embodiments of FIGS. 5-8, the "first" (or "#1") surface is exposed to an outdoor environment. Accordingly, it is the #1 surface that radiation from the sun first strikes. The external surface of the outboard pane is the so-called first surface. Moving from the #1 surface toward the interior of the building, the next surface is the "second" (or "#2") surface. Thus, the internal surface of the outboard pane is the so-called second surface. Moving further toward the interior of the building, the next surface is the "third" (or "#3") surface, followed by the "fourth" (or "#4") surface. This convention is carried forward for IG units having more than four major pane surfaces. Thus, for a triple-pane IG unit, the #6 surface would be the external surface of the inboard pane.

One group of embodiments provides a triple glazing (e.g., an IG unit having three panes), and coating 7 is provided on the #6 surface of the glazing. In embodiments of this nature, the #1 and/or #2 surfaces may have other functional coatings. The #1 surface, for example, may also have a transparent electrically conductive coating 7', and/or the #2 surface may have a silver-based low-emissivity coating.

In some cases, the substrate 10' is heated prior to film deposition, during deposition, or both. Additionally or alternatively, the coated substrate 10' can be heat treated after being coated. If desired, the post-deposition heat treatment (such as glass tempering) can be performed in air. When the coated substrate 10' is heat treated, defects in the film can be healed and improvement of crystalline structure can occur in the indium tin oxide film 20 without an uncontrollable change in the chemistry of this transparent conductive film. When provided, the tin oxide film 100, optionally together with one or more overlying films of the nature described above, may provide resistance to oxygen reaching and reacting with the indium tin oxide film 20 so as to cause uncontrollable change in its chemistry during heat treatment. The film materials and thicknesses described herein are believed to be suitable for accomplishing this object.

In certain embodiments, the coating 7 is on a glass pane, and this coated glass pane is heat treated through a process that leaves the coated glass cut-able by conventional glass cutting techniques. The heat treatment, for example, can involve using lower temperature for conversion so as to maintain the stress in the glass such that the coated glass remains cut-able even after the heat treatment.

In FIGS. 5-8, the substrate 10' is a transparent pane that is part of an IG unit 110. Commonly, the IG unit 110 has an exterior pane 10 and an interior pane 10' separated by at least one between-pane space 800. A spacer 900 (which can optionally be part of a sash) is provided to separate the panes 10 and 10'. The spacer 900 can be secured to the internal surfaces of each pane using an adhesive or seal 700. In some cases, an end sealant 600 is also provided. In the illustrated embodiments, the exterior pane 10 has an external surface 12 (the #1 surface) and an internal surface 14 (the #2 surface). The interior pane 10' has an internal surface 16 (the #3 surface) and, in some cases (i.e., when the IG unit is a double-pane unit), an external surface 18 (the #4 surface). In other embodiments, the IG unit 110 has three panes, such that the external surface 18 of the interior pane 10' is the #6 surface.

The IG unit 110 can optionally be mounted in a frame (e.g., a window sash or frame) such that the external surface 12 of the exterior pane 10 is exposed to an outdoor environment 77 while the external surface 18 of the interior pane 10' is exposed to a room-side interior environment. Each internal surface of the unit is exposed to a between-pane space 800 of the IG unit. In some embodiments, the IG unit 100 is a vacuum IG unit. If desired, the IG unit 110 may have a between-pane 800 filled with an aerogel.

Figure 5:
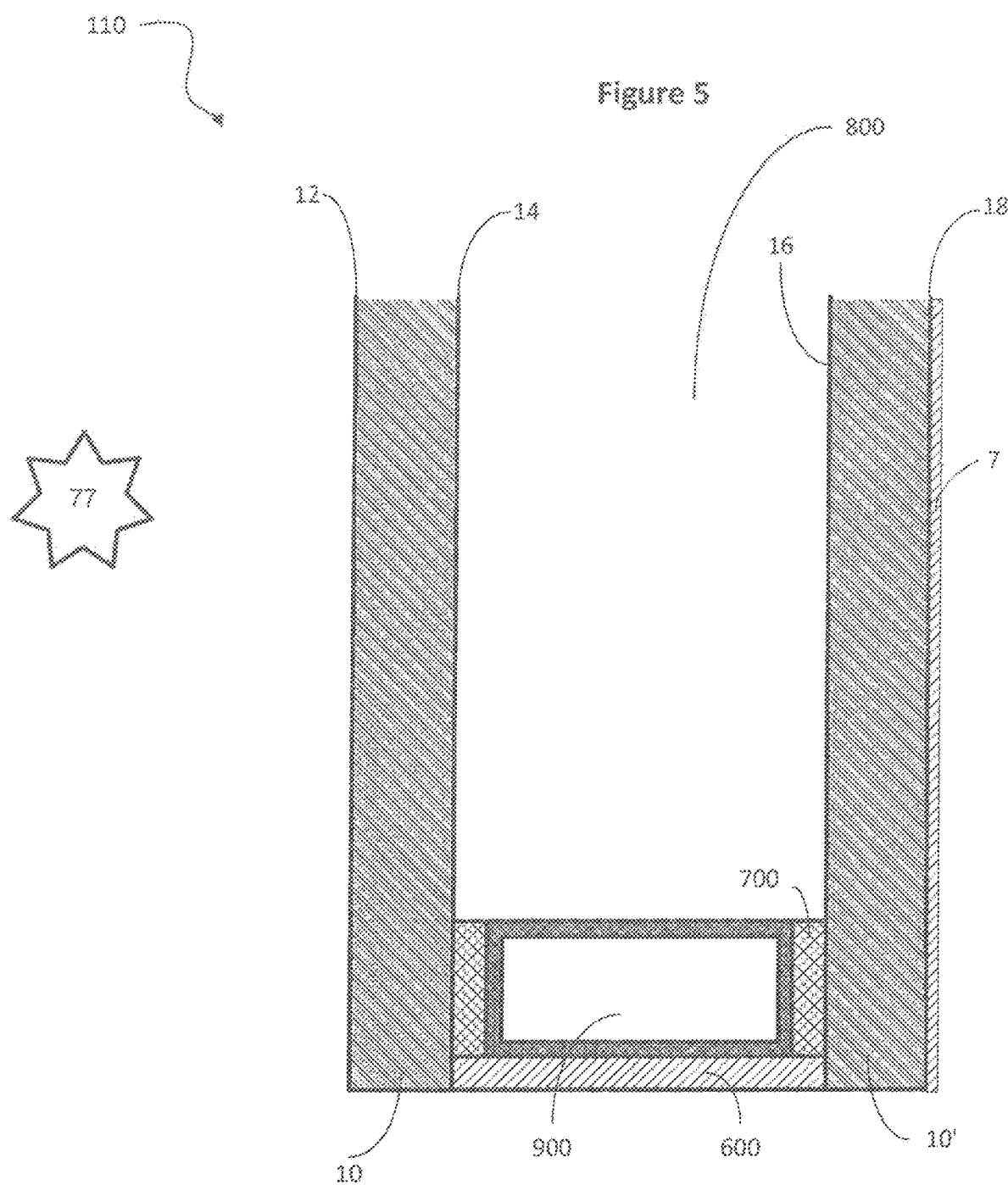
FIG. 5 is a partially broken-away schematic cross-sectional side view of a multiple-pane insulating glazing unit that includes an exterior pane and an interior pane, the interior pane having a fourth surface carrying a transparent electrically conductive coating in accordance with certain embodiments of the invention.

The IG unit 110 includes a transparent electrically conductive coating 7 in accordance with any embodiment described herein. In the embodiment of FIG. 5, the external surface 18 of pane 10' bears a transparent electrically conductive coating 7. Here, the illustrated coating 7 is exposed to an environment (in some cases, a temperature-controlled living space) inside a home or another building.

Figure 7:
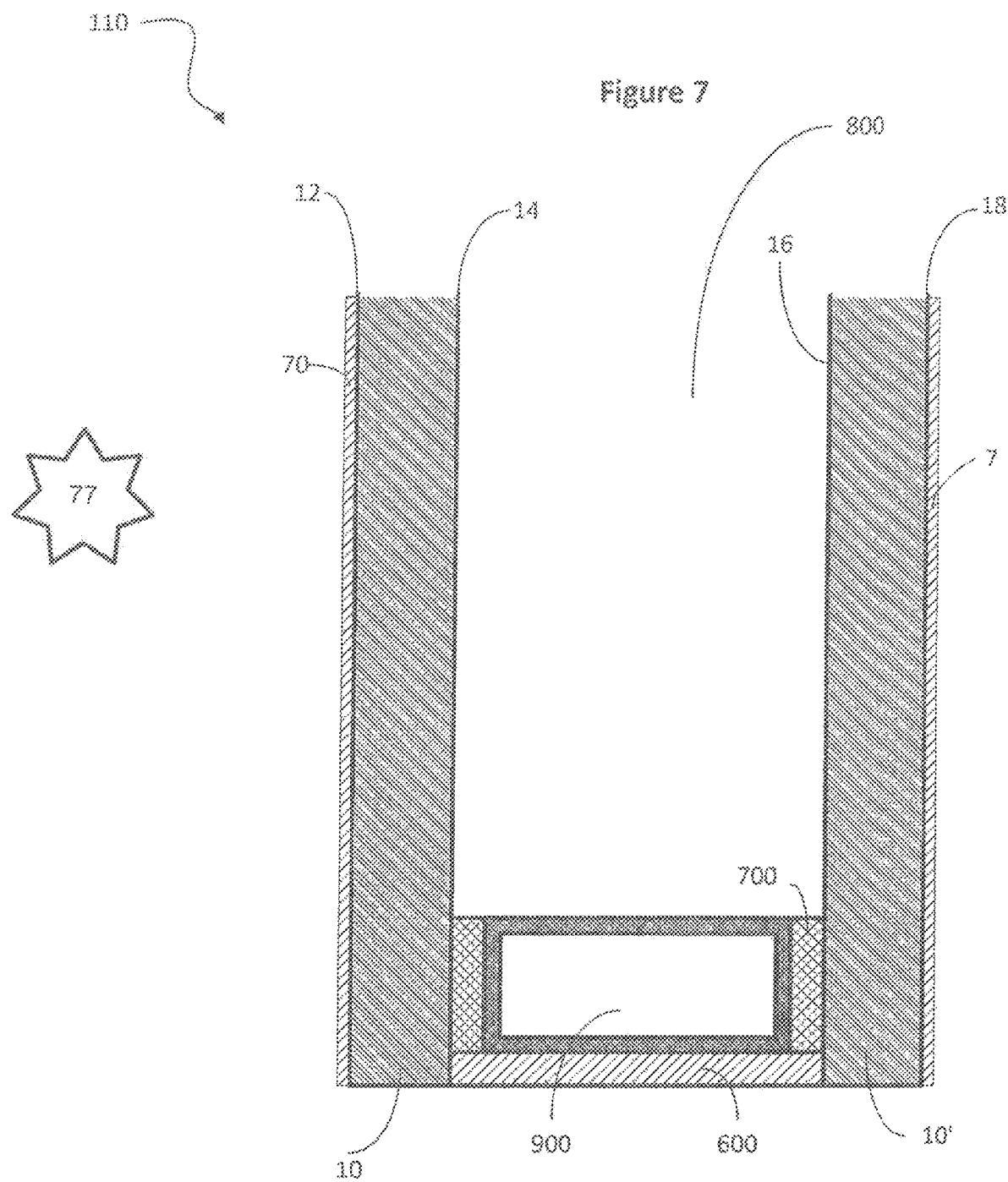
FIG. 7 is a partially broken-away schematic cross-sectional side view of a multiple-pane insulating glazing unit that includes an exterior pane and an interior pane, the exterior pane having a first surface carrying a hydrophilic and/or photocatalytic film, and the interior pane having a fourth surface carrying a transparent electrically conductive coating, in accordance with certain embodiments of the invention.

The IG unit 110 can further include one or more films comprising titanium oxide 70, such as a hydrophilic and/or photocatalytic film. In the embodiment of FIG. 7, for example, a film comprising titanium oxide 70 is provided on the external surface 12 of pane 10, so as to be exposed to an outdoor environment 77 (and thus in periodic contact with rain). The film comprising titanium oxide 70 can be part of a photocatalytic and/or hydrophilic coating. If desired, the IG unit 110 can bear two films comprising titanium oxide, e.g., one such film 70 on the external surface 12 of pane 10 and another such film 70 over the rest of the coating 7 on the external surface 18 of pane 10'.

Thus, in some cases, there are two films comprising titanium oxide 70 on the IG unit. When provided, these two coatings may be different. For example, the external surface of the outboard pane and the external surface of the inboard pane can both have photocatalytic films, but they can be different (e.g., in terms of thickness or composition). For example, a photocatalytic film on the external surface of the inboard pane can be adapted for activation by indoor light, while a photocatalytic film on the external surface of the outboard pane may require direct sunlight for activation. More generally, the indoor photocatalytic film may have a higher level of photoactivity (e.g., it may be thicker or have a more highly photoactive composition) than the outside photocatalytic film. When provided, the films comprising titanium may, of course, be applied over one or more other films.

Figure 8:
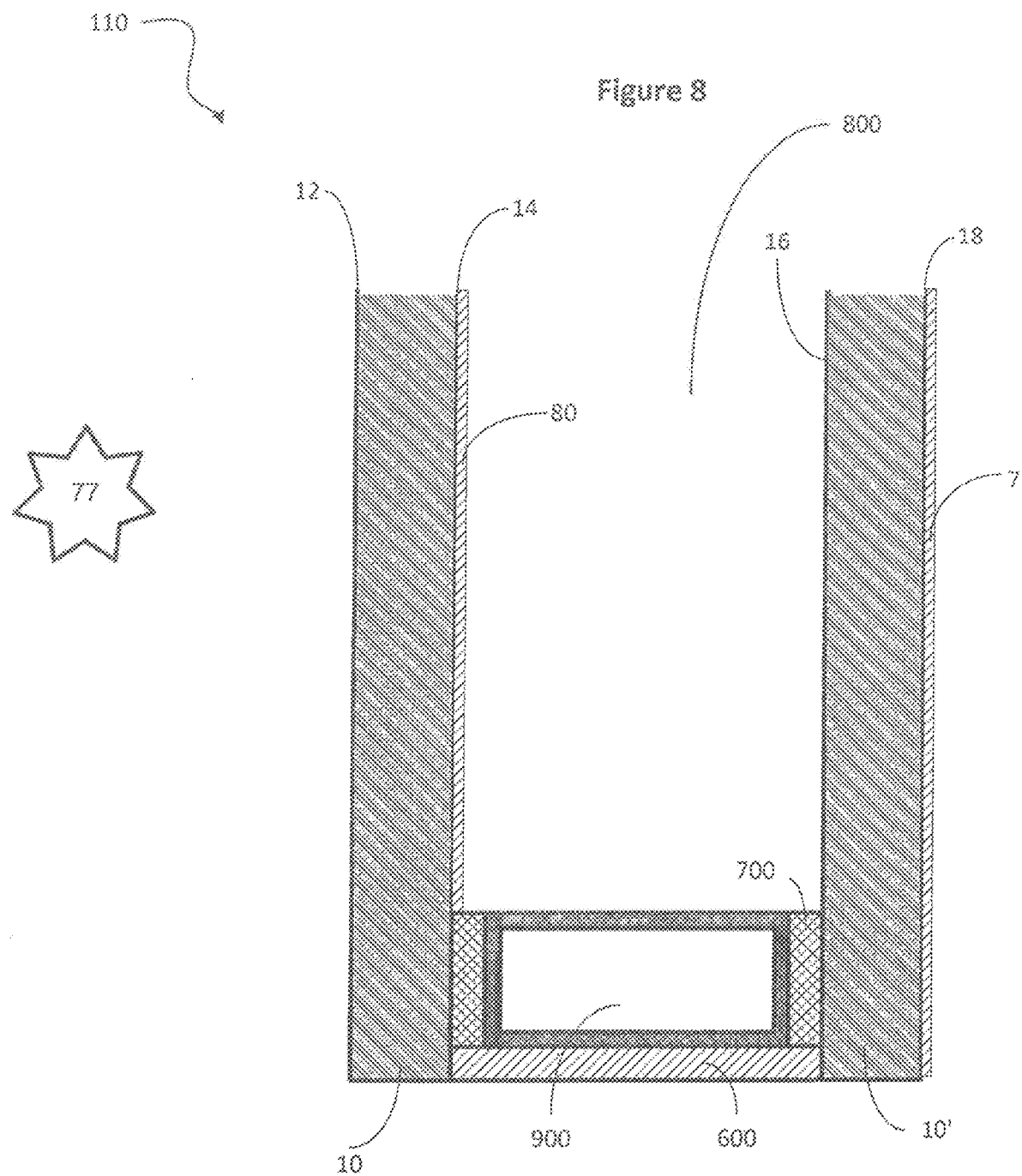
FIG. 8 is a partially broken-away schematic cross-sectional side view of a multiple-pane insulating glazing unit that includes an exterior pane and an interior pane, the exterior pane having a second surface carrying a low-emissivity coating, and the interior pane having a fourth surface carrying a transparent electrically conductive coating, in accordance with certain embodiments of the invention.

The IG unit 110 may also include one or more low-emissivity coatings 80. In the embodiment of FIG. 8, the IG unit includes a low-emissivity coating 80 on the internal surface 14 of pane 10. When provided, the low-emissivity coating 80 preferably includes at least one silver-inclusive film, which preferably contains more than 50% silver by weight (e.g., a metallic silver film). If desired, a low-emissivity coating 80 can alternatively be on the internal surface 16 of pane 10'. In some embodiments, the coating 80 includes three or more infrared-reflective films (e.g., silver-containing films). Low-emissivity coatings with three or more infrared-reflective films are described in U.S. application Ser. No. 11/546,152 and U.S. Pat. Nos. 7,572,511 and 7,572,510 and 7,572,509 and Ser. No. 11/545,211 and U.S. Pat. Nos. 7,342,716 and 7,339,728, the salient teachings of each of which are incorporated herein by reference. In other cases, the low-emissivity coating can be a "single silver" or "double silver" low-emissivity coating, which are well-known to skilled artisans. Thus, certain embodiments provide the IG unit 110 with a single silver low-emissivity coating, e.g., on the #2 surface in combination with coating 7 on an external pane surface of the IG unit.

Figure 6:
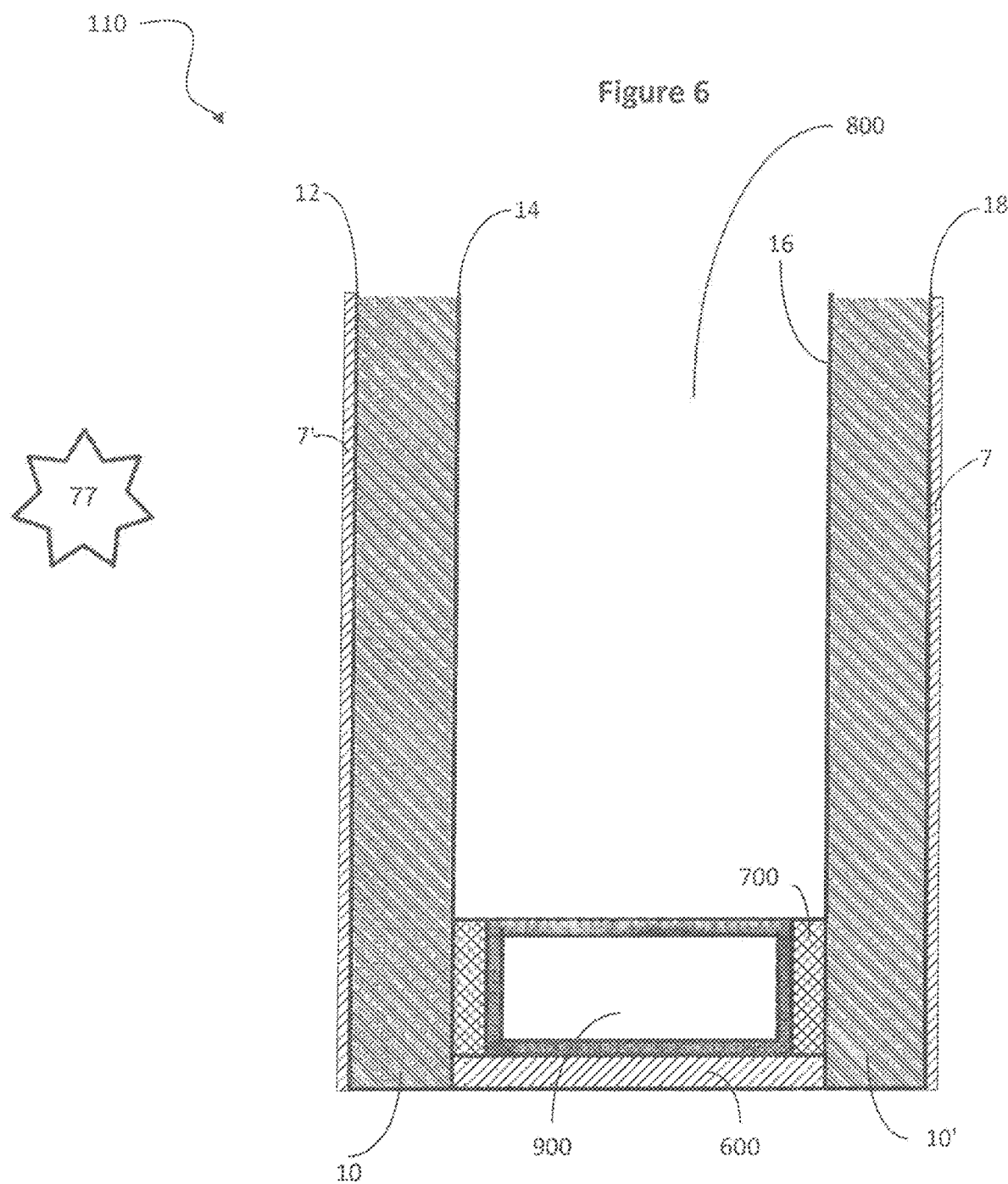
FIG. 6 is a partially broken-away schematic cross-sectional side view of a multiple-pane insulating glazing unit that includes an exterior pane and an interior pane, the exterior pane having a first surface carrying a transparent electrically conductive coating, and the interior pane having a fourth surface carrying another transparent electrically conductive coating, in accordance with certain embodiments of the invention.

If desired, the embodiment of FIG. 6 can have a low-emissivity coating on surface 14 or on surface 16. Similarly, the embodiment of FIG. 7 can optionally have a low-emissivity coating on surface 14 or on surface 16.

While the embodiment of FIG. 5 shows the transparent electrically conductive coating 7 being on the #4 surface of an IG unit 110, the #1 surface of the IG unit can alternatively be provided with a transparent electrically conductive coating. In such cases, there can optionally be a low-emissivity coating on surface 14 or on surface 16.

FIG. 6 shows an IG unit 110 having a first transparent electrically conductive coating 7 on the #4 surface of the IG unit, while a second transparent electrically conductive coating 7' is on the #1 surface of the IG unit. For triple glazed IG units, a first transparent electrically conductive coating can be provided on the #6 surface of the IG unit, while a second transparent electrically conductive coating is provided on the #1 surface of the IG unit. Or, there can simply be a single transparent electrically conductive coating on the #1 surface.

Thus, it can be appreciated that the transparent electrically conductive coating 7 may be provided on one or more of the following IG unit surfaces: the #1 surface, the #4 surface (for a double glazing), and the #6 surface (for a triple glazing). When applied on the #1 surface, the pane will stay warmer and have less condensation. When applied on a #4 or #6 surface, the inboard pane will stay cooler and save energy, but it may catch condensation. In such cases, a hydrophilic and/or photocatalytic coating may be provided over coating 7 so as to encourage rapid evaporation of any condensation that may occur. The transparent electrically conductive coating 7 can also be beneficial for a monolithic glazing, a laminated glass glazing, etc.

The present coating 7 has a number of beneficial properties. The ensuing discussion reports several of these properties. In some cases, properties are reported herein for a single (i.e., monolithic) pane 10' bearing the present coating 7 on one surface 18 ("the present pane"). In other cases, these properties are reported for a double-pane IG unit 110 having the transparent electrically conductive coating 7 on the #4 surface 18 and a triple silver low-emissivity coating on the #2 surface. The triple silver low-emissivity coating is known commercially as the LoE$^3$-366™ product from Cardinal CG Company. In such cases, the reported properties are for an IG unit wherein both panes are clear 2.2 mm soda lime float glass with a ½ inch between-pane space filled with an insulative gas mix of 90% argon and 10% air ("the present IG unit"). Of course, these specifics are by no means limiting to the invention. For example, the transparent electrically conductive coating can alternatively be provided on the #1 surface of the IG unit, the low-emissivity coating can alternatively be on the #3 surface, the low-emissivity coating can alternatively be a single or double silver low-emissivity coating, etc. Absent an express statement to the contrary, the present discussion reports determinations made using the well-known WINDOW 7.1 computer program (e.g., calculating center of glass data) under NFRC100-2010 conditions.

As already explained, the indium tin oxide film 20 is electrically conductive and imparts low sheet resistance in the coating 7. The sheet resistance of the present coating 7 is less than 75 Ω/square. Preferably, the sheet resistance of this coating 7 is 55 Ω/square or less, such as less than 20 Ω/square (e.g., less than 15 Ω/square, less than 14 Ω/square, or even less than 13 Ω/square). The sheet resistance of the coating can be measured in standard fashion using a non-contact sheet resistance meter.

The coating 7 also has low emissivity. The emissivity of the coating 7 is less than 0.75. Preferably, the emissivity is 0.55 or less, such as less than 0.25, less than 0.22, less than 0.2, or even less than 0.18, such as about 0.15. In contrast, an uncoated pane of clear glass would typically have an emissivity of about 0.84.

The term "emissivity" is well known in the present art. This term is used herein in accordance with its well-known meaning to refer to the ratio of radiation emitted by a surface to the radiation emitted by a blackbody at the same temperature. Emissivity is a characteristic of both absorption and reflectance. It is usually represented by the formula: $E=1-Reflectance$. The present emissivity values can be determined as specified in "Standard Test Method for Emittance of Specular Surfaces Using Spectrometric Measurements," NFRC 301-2010, the entire teachings of which are incorporated herein by reference.

In addition to low sheet resistance and low emissivity, the U Value of the present IG unit 110 is very low. As is well known, the U Value of an IG unit is a measure of the thermal insulating property of the unit. The smaller the U value, the better the insulating property of the unit. The U Value of the present IG unit is less than 0.35 (i.e., center of glass U value), preferably less than 0.3, more preferably less than 0.25, and perhaps optimally less than 0.24, such as from 0.20-0.23.

The term U Value is well known in the present art. It is used herein in accordance with its well-known meaning to express the amount of heat that passes through one unit of area in one unit of time for each unit of temperature difference between a hot side of the IG unit and a cold side of the IG unit. The U Value can be determined in accordance with the standard specified for $U_{winter}$ in NFRC 100-2014, the teachings of which are incorporated herein by reference.

A tradeoff is sometimes made in low U value coatings whereby the film(s) selected to achieve a low U value have the effect of decreasing the visible transmittance to a lower level than is desired and/or increasing the visible reflectance to a higher level than is ideal. As a consequence, windows bearing these coatings may have unacceptably low visible transmission, a somewhat mirror-like appearance, or suboptimal color properties.

In combination with the beneficial properties discussed above, the present coating 7 has good optical properties. As noted above, a tradeoff is sometimes made in low U value coatings whereby the films selected to achieve a low U value have the effect of restricting the visible transmission to a level that is lower than ideal.

To the contrary, the present coating 7 provides a good combination of these properties. For example, the present IG unit 110 (and the present pane 10', whether monolithic or as part of the IG unit 110) has a visible transmittance $T_v$ of greater than 0.5 (i.e., greater than 50%). Preferably, the present IG unit 110 (and the present pane 10', whether monolithic or insulated) achieves a visible transmittance $T_v$ of greater than 0.55 (i.e., greater than 55%), or greater than 0.60 (i.e., greater than 60%), such as about 0.63.

Further, if the triple silver low-emissivity coating is replaced with a double silver low-emissivity coating like the LoE$^2$-270™ or LoE$^2$-272™ coatings from Cardinal CG Company, then the present IG unit 110 (and the present pane 10', whether monolithic or insulated) can exhibit a visible transmittance $T_v$ of greater than 0.65 (i.e., greater than 65%), or even greater than 0.67.

Moreover, if the triple silver low-emissivity coating is replaced with a single silver low-emissivity coating like the LoE-180™ coating from Cardinal CG Company, then the present IG unit 110 (and the present pane 10', whether monolithic or insulated) can exhibit a visible transmittance $T_v$ of greater than 0.70 (i.e., greater than 70%), or even greater than 0.75.

While the desired level of visible transmittance can be selected and varied to accommodate different applications, certain preferred embodiments provide a coated pane 10' having a post-heat-treatment monolithic visible transmission of greater than 80%, greater than 82%, or even greater than 85%.

The term "visible transmittance" is well known in the art and is used herein in accordance with its well-known meaning to refer to the percentage of all incident visible radiation that is transmitted through the IG unit 110. Visible radiation constitutes the wavelength range of between about 380 nm and about 780 nm. Visible transmittance, as well as visible reflectance, can be determined in accordance with NFRC 300-2014, Standard Test Method for Determining the Solar and Infrared Optical Properties of Glazing Materials and Fading Resistance of Systems. The well-known WINDOW 7.1 computer program can be used in calculating these and other reported optical properties.

The present coating 7 can provide a visible absorption of less than 10%. Preferably, the visible absorption is less than 5% (e.g., after heat treatment).

The present coating 7 can achieve desirable reflected color properties in combination with excellent thermal insulating properties. For example, the present IG unit 110 preferably exhibits an exterior reflected color characterized by an "a" color coordinate of between −7 and 2 (e.g., between −5 and 1, such as about −1.9) and a "b" color coordinate of between −9 and 0 (e.g., between −6 and −1, such as about −3.4).

The present discussion of color properties is reported using the well-known color coordinates of "a" and "b." In more detail, these color coordinates result from conventional use of the well-known Hunter Lab Color System (Hunter methods/units, Ill. D65, 10 degree observer). The present color properties can be determined as specified in ASTM Method E 308, the relevant teachings of which are incorporated herein by reference.

In certain embodiments, the foregoing color properties are provided in combination with the sheet resistance, emissivity, U value, and visible transmission properties reported above. For example, the following chart depicts preferred combinations of properties in accordance with certain embodiments (the tabulated properties are after heat treatment).

|  | preferred | more preferred |
| --- | --- | --- |
| Sheet resistance | less than 20 Ω/square | less than 15 Ω/square |
| emissivity | less than 0.25 | less than 0.18 |
| U value | less than 0.3 | less than 0.24 |
| $T_{vis\ monolithic}$ | greater than 75% | greater than 85% |

In one embodiment, a multiple-pane insulating glazing unit includes an internal pane surface bearing a low-emissivity coating that has only one film comprising silver. The film comprising silver preferably contains at least 50% silver by weight. The low-emissivity coating is exposed to a between-pane space of the IG unit. A desired one of the two external pane surfaces bears a coating 7 comprising both an indium tin oxide film 20 and a tin oxide film 100. The tin oxide film 100 is located over the indium tin oxide film 20. In the present embodiments, the indium tin oxide film 20 has a sheet resistance of less than 20 ohms/square and a thickness of between 1,000 Å and 1,600 Å, while the tin oxide film 100 has a thickness of between 90 Å and 1,200 Å, and preferably is devoid of indium oxide. In the present embodiments, the IG unit has a U value of less than 0.25 together with a visible transmission of greater than 75%. In addition, the IG unit exhibits an exterior reflected color characterized by an "$a_h$" color coordinate of between −6 and 0 and a "$b_h$" color coordinate of between −8 and −1.

In another embodiment, an IG unit includes an internal pane surface bearing a low-emissivity coating that has only two films comprising silver. Preferably, each film comprising silver contains at least 50% silver by weight. The low-emissivity coating is exposed to a between-pane space of the IG unit. A desired one of the two external pane surfaces bears a coating 7 comprising both an indium tin oxide film 20 and a tin oxide film 100. The tin oxide film 100 is located over the indium tin oxide film 20. In the present embodiments, the indium tin oxide film 20 has a sheet resistance of less than 20 ohms/square and a thickness of between 1,000 Å and 1,600 Å, while the tin oxide film 100 has a thickness of between 90 Å and 1,200 Å, and preferably is devoid of indium oxide. In the present embodiments, the IG unit has a U value of less than 0.25 together with a visible transmission of greater than 65%. In addition, the IG unit exhibits an exterior reflected color characterized by an "$a_h$" color coordinate of between −6 and 0 and a "$b_h$" color coordinate of between −8 and −1.

In still another embodiment, an IG unit includes an internal pane surface bearing a low-emissivity coating that includes three films comprising silver. Preferably, each film comprising silver contains at least 50% silver by weight. The low-emissivity coating is exposed to a between-pane space of the IG unit. A desired one of the two external pane surfaces bears a coating 7 comprising both an indium tin oxide film 20 and a tin oxide film 100. The tin oxide film 100 is located over the indium tin oxide film 20. In the present embodiments, the indium tin oxide film 20 has a sheet resistance of less than 20 ohms/square and a thickness of between 1,000 Å and 1,600 Å, while the tin oxide film 100 has a thickness of between 90 Å and 1,200 Å, and preferably is devoid of indium oxide. In the present embodiments, the IG unit has a U value of less than 0.25 together with a visible transmission of greater than 60%. In addition, the IG unit exhibits an exterior reflected color characterized by an "$a_h$" color coordinate of between −6 and 1and a "$b_h$" color coordinate of between −7 and −1.

In the foregoing three embodiments, the IG unit can, for example, be a double-pane unit with coating 7 on the #4 surface and the low-emissivity coating on the #2 surface. Coating 7 can consist of the following layers: silicon dioxide at about 100 Å/ITO (90% In/10% Sn) at about 1,200-1,400 Å/tin oxide at about 150 Å/SiON at about 900 Å. The low-emissivity coating in the first of the foregoing three embodiments can, for example, be a single-silver low-emissivity coating like the commercially available LoE-180™ coating from Cardinal CG Company of Eden Prairie, Minn., USA. The low-emissivity coating in the second of the foregoing three embodiments can, for example, be a double-silver low-emissivity coating like the commercially available LoE²-270™ or LoE²-272™ coatings from Cardinal CG Company. The low-emissivity coating in the third of the foregoing three embodiments can, for example, be a triple-silver low-emissivity coating like the commercially available LoE³-366™ coating from Cardinal CG Company.

The invention provides one particular group of embodiments wherein the coating 7 has an intermediate level of electrical conductivity. In this particular group of embodiments, the tin oxide overcoat layer 100, while preferred, need not always be present. The sheet resistance and emissivity are higher than the preferred and more preferred ranges tabulated above. Specifically, the emissivity ranges from 0.25 to 0.55. The monolithic visible transmission ($T_{vis\ monolithic}$) preferably is greater than 75%, more preferably is greater than 80%, and perhaps optimally is greater than 85% (e.g., after heat treatment). The visible absorption preferably is less than 10%, and more preferably is less than 5% (e.g., after heat treatment). In the present embodiments, the indium tin oxide film preferably has a thickness of between 100 Å and 2,000 Å, such as between 100 Å and 1,200 Å. In some of the present embodiments, the thickness of the indium tin oxide film is greater than 100 Å but less than 1,100 Å, less than 750 Å, less than 500 Å, or even less than 300 Å. One exemplary non-heat-treated coating that may be useful for the present embodiments has a layer of ITO on a glass substrate, where the ITO layer has a thickness of about 1,060 Å. In this case, the emissivity is about 0.45. In another example, a heat-treated coating has the following layer stack: glass/ITO at about 170 Å/SnO₂ at about 1,135

Å/SiON at about 560 Å. In this case, the post-heat-treatment emissivity is about 0.5. In still another example, a heat-treated coating has the following layer stack: glass/ITO at about 520 Å/SnO$_2$ at about 785 Å/SiON at about 560 Å. In this case, the post-heat-treatment emissivity is about 0.31. If desired, a base coat 15 of the nature described previously may be added to any of these film stacks. Additionally or alternatively, a layer comprising titanium oxide may be added.

The invention also provides methods for producing the present coating 7. In preferred embodiments, the films are deposited by sputtering. Sputtering is well known in the present art.

In accordance with the present methods, a substrate 10' having a surface 18 is provided. If desired, this surface 18 can be prepared by suitable washing or chemical preparation. The present coating 7 is deposited on the surface 18 of the substrate 10', e.g., as a series of discrete layers, as a thickness of graded film, or as a combination including at least one discrete layer and at least one thickness of graded film. The coating can be deposited using any thin film deposition technique that is suitable for depositing the desired film materials at the desired low haze and roughness levels. Thus, the present invention includes method embodiments wherein, using any one or more appropriate thin film deposition techniques, the films of any embodiment disclosed herein are deposited sequentially upon a substrate (e.g., a sheet of glass or plastic). One preferred method utilizes DC magnetron sputtering, which is commonly used in industry. Reference is made to Chapin's U.S. Pat. No. 4,166,018, the teachings of which are incorporated herein by reference. In some cases, the present coatings are sputtered by AC or pulsed DC from a pair of cathodes. HiPIMS and other modern sputtering methods can be used as well.

Briefly, magnetron sputtering involves transporting a substrate 10' through a series of low-pressure zones (or "chambers" or "bays") in which the various film regions that make up the coating are sequentially applied. To deposit oxide film, the target may be formed of an oxide itself, and the sputtering may proceed in an inert or oxidizing atmosphere. To deposit indium tin oxide, for example, a ceramic indium tin oxide target can be sputtered in an inert or oxidizing atmosphere. Alternatively, the oxide film can be deposited by sputtering one or more metallic targets (e.g., of metallic indium tin material) in a reactive atmosphere. Tin oxide can be deposited by sputtering one or more tin targets in a reactive atmosphere containing oxygen gas. Silicon nitride can be deposited by sputtering one or more silicon targets (which may be doped with aluminum or the like to improve conductivity) in a reactive atmosphere containing nitrogen gas. Silicon oxynitride can be deposited by sputtering one or more silicon targets (which may be doped with aluminum or the like) in a reactive atmosphere containing oxygen and nitrogen gas. Titanium dioxide can be deposited by sputtering one or more titanium targets (which may be doped with tungsten or the like) in a reactive atmosphere containing oxygen gas. The thickness of the deposited films can be controlled by varying the speed of the substrate, by varying the power on the targets, or by varying the ratio of power to partial pressure of the reactive gas.

Following is a non-limiting method for depositing one embodiment of the present coating 7 onto a glass substrate. A pair of rotatable metallic indium-tin targets is sputtered while an uncoated glass substrate is conveyed past the activated targets at a rate of about 115 inches per minute when depositing the ITO film. In this example, the relative weight amounts of the two metals in the sputterable material of the target is: indium 90%, tin 10%. Here, a power of 6 kW is used for the pair of rotary targets. The sputtering atmosphere is 6 mTorr with a gas flow of 992 sccm of argon and 200 sccm of oxygen. The resulting indium tin oxide film has a thickness of about 520 Å. Directly over this ITO film, a tin oxide film is applied. Here, the tin oxide is applied at a thickness of about 785 Å by conveying the glass sheet at about 115 inches per minute past a pair of rotary tin targets sputtered at 20 kW in a 6 mTorr atmosphere with a gas flow of 629 sccm of oxygen and 992 sccm of argon. Directly over the tin oxide film, a silicon oxynitride film is applied at a thickness of about 560 Å by conveying the glass sheet at about 20 inches per minute past a pair of rotary silicon targets (83% Si, 17% Al, by weight) sputtered at 20 kW in a 5 mTorr atmosphere with a gas flow of 120 sccm of oxygen and 790 sccm of nitrogen.

The coated substrate is then heat treated. Various heat treatment processes can be used. For example, the coated substrate can be heat treated on a conventional production tempering line. In tempering, glass is placed in a furnace maintained at about 680-705° C. (preferably controlled to 690-700° C.). The glass is typically held in the furnace for 100-120 seconds with constant movement to better ensure temperature uniformity of the product. This is intended to raise the glass temperature to about 640° C. The glass is then removed from the furnace and placed in a stream of air for about 50 seconds such that the glass is cool enough for an operator to handle. Moreover, as already explained, the substrate can alternatively be heated prior to film deposition, during deposition, or both.

Figure 9:
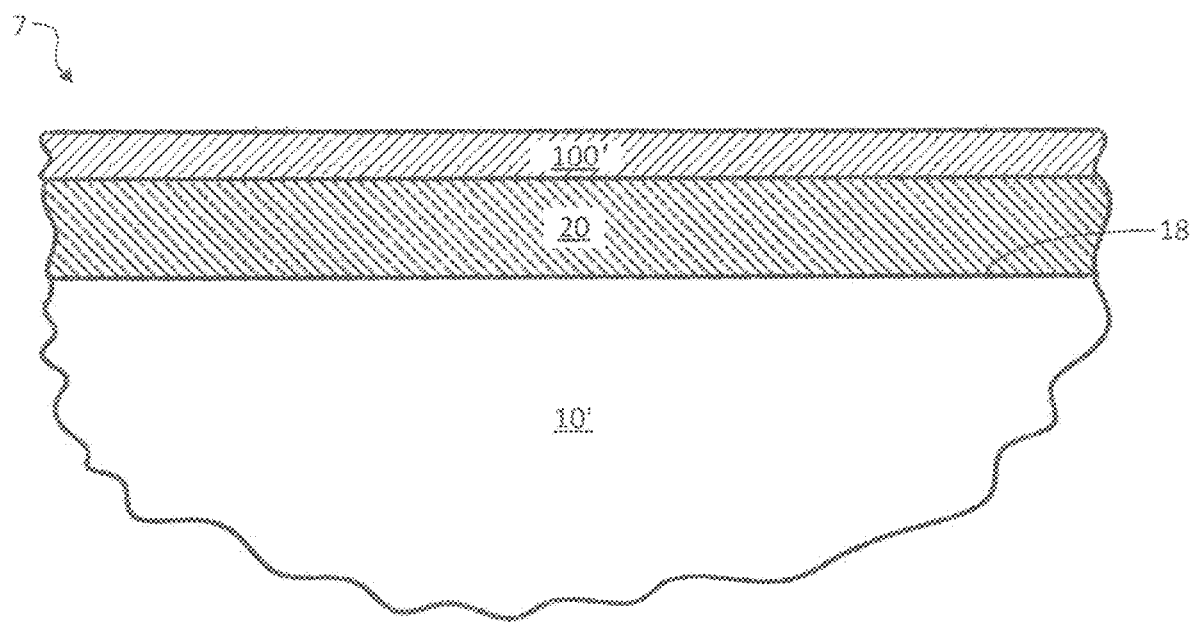
FIG. 9 is a broken-away schematic cross-sectional view of a substrate having a major surface bearing a transparent electrically conductive coating in accordance with certain embodiments of the present invention.

In certain embodiments, the tin oxide film 100 is omitted from the coating 7 and is replaced with an alloy oxide overcoat film 100'. Reference is made to FIG. 9. In such embodiments, the alloy oxide overcoat film 100' is located over the indium tin oxide film 20. In the present embodiments, the indium tin oxide film 20 can be of the nature (e.g., can have a thickness and conductivity) described above. By saying "alloy" in referring to the alloy oxide overcoat film, we simply mean the oxide overcoat film includes two or more elements selected from metals and metalloids. The alloy oxide overcoat film 100' includes both tin and at least one other metal or metalloid. In any such embodiment, the alloy oxide overcoat film 100' can optionally be an exposed outermost film of the coating 7. Additionally or alternatively, the alloy oxide overcoat film 100' can optionally be in contact with the indium tin oxide film 20.

For any of the present embodiments, the alloy oxide overcoat film 100' can have a thickness of between 200 angstroms and 1,350 angstroms, in combination with indium tin oxide film 20 having a thickness of between 500 angstroms and 2,000 angstroms. For example, the alloy oxide overcoat film 100' can have a thickness of from 250 angstroms to 1,300 angstroms, or from 400 angstroms to 1,200 angstroms, or from 450 angstroms to 700 angstroms, or from 300 angstroms to 900 angstroms, or from 900 angstroms to 1,100 angstroms. On the other hand, indium tin oxide film 20 can have a thickness of from 900 angstroms to 2,000 angstroms, or from 1,000 angstroms to 1,900 angstroms, or from 1,200 angstroms to 1,750 angstroms, or even from 1,250 angstroms to 1,550 angstroms. Any thickness range mentioned in this paragraph or elsewhere in this disclosure for indium tin oxide film 20 can be provided in combination with any thickness ranges mentioned in this paragraph or elsewhere in this disclosure for the alloy oxide overcoat film 100'.

In any embodiment that includes the alloy oxide overcoat film 100', the coating 7 can optionally be devoid of a metal layer, or at least devoid of a silver layer. This, however, is not required in all cases. In embodiments where the coating 7 is devoid of a metal layer, skilled artisans will appreciate that a coating having a metal layer (e.g., any of the low-emissivity coatings described above) can optionally be provided on a different surface of the IG unit (i.e., on a surface that does not bear coating 7).

Figure 4:
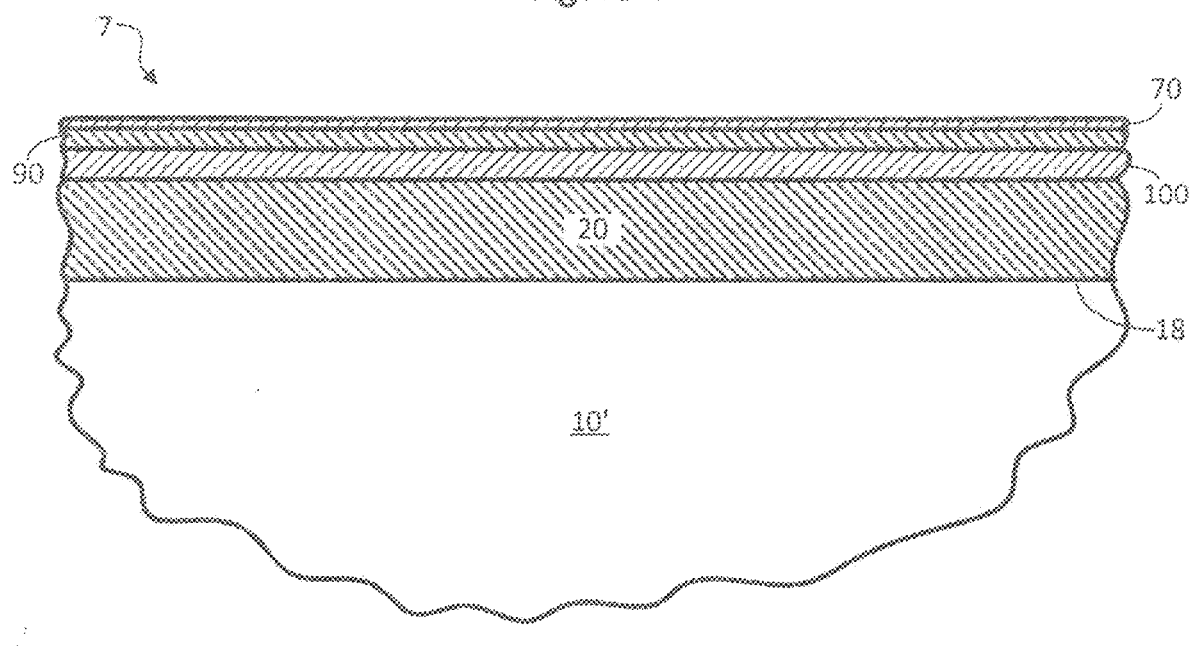
FIG. 4 is a broken-away schematic cross-sectional view of a substrate having a major surface bearing a transparent electrically conductive coating in accordance with yet other embodiments of the invention.

Further, in any embodiment that includes the alloy oxide overcoat film 100', the coating 7 can optionally include one or more films between film 20 and the substrate 10'. Such additional film(s) can comprise, for example, silicon dioxide, silicon oxynitride, silicon nitride, or tin oxide. Reference is made to FIG. 2, with the idea that film 100 shown in FIG. 2 would be replaced with film 100' but that the discussion of optional film 15 still applies. Furthermore, the coating 7 in the present embodiments can optionally include one or more films between film 20 and the alloy oxide overcoat film 100'. Such additional film(s) can comprise, for example, silicon nitride or tin oxide. Additionally or alternatively, one or more films can be provided over the alloy oxide overcoat film 100'. As non-limiting examples, such films can comprise silicon nitride, silicon oxynitride, silicon oxide, or titanium dioxide. Reference is made to FIG. 3, with the idea that film 100 shown in FIG. 3 would be replaced with film 100' but that the discussion of optional film 90 still applies. Similarly, reference is made to FIG. 4, with the idea that film 100 shown in FIG. 4 would be replaced with film 100' but that the discussion of optional films 70 and 90 still applies.

In some of the present embodiments, the coating 7 has a total thickness of less than 2,400 Å. This can optionally be the case in any embodiment involving the alloy oxide overcoat film 100'. A base film (e.g., silica at about 100 Å) can optionally be added. Additionally or alternatively, a nitride film (e.g., silicon nitride at about 150 Å) may be added between the ITO and alloy oxide overcoat films. More will be said of this later.

In one group of embodiments, the alloy oxide overcoat film 100' comprises indium tin oxide. In such cases, the alloy oxide overcoat film 100' can comprise any indium tin oxide film composition described above for indium tin oxide film 20. Thus, in the present embodiment group, the coating 7 can include both a first indium tin oxide film (film 20) and a second indium tin oxide film (film 100'). When provided, the second indium tin oxide film is located over, and preferably is in contact with, the first indium tin oxide film. In the present embodiment group, the coating 7 preferably includes two, but not more than two, indium tin oxide films.

In the present group of embodiments, the first indium tin oxide film (film 20) preferably is more electrically conductive than the second indium tin oxide film (film 100'). In other words, the second indium tin oxide film preferably has a higher sheet resistance than the first indium tin oxide film. For example, the sheet resistance of the first indium tin oxide film preferably is less than 25 ohms per square, more preferably less than 18 ohms per square, or even less than 15 ohms per square, such as between 6 and 15 ohms per square. In some cases, it is even less than 13 ohms per square, such as about 12.5 ohms per square. In contrast, the sheet resistance of the second indium tin oxide film preferably is greater than 100 ohms per square, or greater than 150 ohms per square, e.g., between 150 and 400 ohms per square, such as about 200 ohms per square.

When provided, the second indium tin oxide film preferably has a thickness that is different from a thickness of the first indium tin oxide film. This can optionally be the case together with the first ITO film having a lower sheet resistance than the second ITO film, as described and exemplified in the immediately preceding paragraph. In some cases, the second indium tin oxide film is thinner than the first indium tin oxide film. For example, the second indium tin oxide film can optionally have a thickness of less than 1,000 Å, or even less than 900 Å, such as about 800 Å, while the first indium tin oxide film 20 has a thickness of greater than 1,000 Å, such as about 1,300 Å.

In preferred embodiments, the first indium tin oxide film is a suboxide (i.e., is substoichiometric), whereas the second indium tin oxide film is fully oxidized (i.e., stoichiometric). This can optionally be the case in any embodiment of the present group. However, it is not always required. For example, in some cases, both the first and second indium tin oxide films are suboxides, and the second indium tin oxide film is more oxidized than the first indium tin oxide film.

The first and second indium tin oxide films can optionally be devoid of metals other than indium and tin. In some cases, the first and second indium tin oxide films each consist of, or consist essentially of, indium tin oxide.

If desired, the second indium tin oxide film can have the same amounts (or substantially the same amounts) of indium and tin as the first indium tin oxide film. This can optionally be the case in any embodiment of the present group. For example, this can be the case in combination with the first indium tin oxide film being a suboxide and the second indium tin oxide film being fully oxidized, and/or in combination with the first ITO film having lower sheet resistance than the second ITO film, as exemplified herein.

In some cases, the two ITO films of the present embodiment group will have thicknesses and sheet resistances in the following ranges:

| | Thickness (angstroms) | sheet resistance (ohms/square) |
|---|---|---|
| First ITO film | 1,050-1,850, preferably 1,100-1,650, such as 1,300 | 6-25, preferably 7-15, such as 12.5 |
| Second ITO film | 400-950 preferably 500-900, such as 800 | 150-400, preferably 175-300, such as 200 |

In such cases, the coating 7 preferably is devoid of a metal film, or at least does not include a silver film, as noted above. In addition, the first indium tin oxide film can optionally be a suboxide while the second indium tin oxide film is fully oxidized. Furthermore, the second indium tin oxide film can optionally have the same amounts (or substantially the same amounts) of indium and tin as the first indium tin oxide film.

In another group of embodiments, the alloy oxide overcoat film 100' comprises aluminum tin oxide (e.g., is an aluminum tin oxide film). In such cases, the alloy oxide overcoat film 100' can comprise any aluminum tin oxide composition. Thus, in the present embodiment group, the coating 7 can include both an indium tin oxide film 20 and an aluminum tin oxide film. The aluminum tin oxide film is located over, and preferably is in contact with, the indium tin oxide film 20. Preferably, the aluminum tin oxide film contains both oxidized aluminum and oxidized tin. In some embodiments, the aluminum tin oxide film is devoid of metals other than aluminum and tin. For example, the aluminum tin oxide film can optionally consist of, or consist essentially of, aluminum tin oxide.

In some embodiments of the present group, the aluminum tin oxide film will contain tin at a weight percent (on a metal-only basis) of from 50 to 90 percent.

In some cases, the indium tin oxide film and the aluminum tin oxide film of the present embodiment group will have thicknesses in the following ranges:

| | Thickness (angstroms) |
|---|---|
| ITO film | 1,050-1,850, preferably 1,100-1,650, such as 1,300 |
| Aluminum tin oxide film | 100-900 preferably 200-800, such as 500 |

In such cases, the coating 7 preferably is devoid of a metal film, or at least does not include a silver film, as noted above. In addition, the indium tin oxide film preferably is a suboxide while the aluminum tin oxide film is fully oxidized. Furthermore, the aluminum tin oxide film can optionally contain tin at a weight percent (on a metal-only basis) of from 50 to 90 percent.

In still another group of embodiments, the alloy oxide overcoat film 100' comprises silicon tin oxide (e.g., is a silicon tin oxide film). In such cases, the alloy oxide overcoat film 100' can comprise any silicon tin oxide composition. Thus, the coating 7 can include both an indium tin oxide film 20 and a silicon tin oxide film. The silicon tin oxide film is located over, and preferably is in contact with, the indium tin oxide film 20. Preferably, the silicon tin oxide film contains both oxidized silicon and oxidized tin. The silicon tin oxide film can optionally be devoid of metals and metalloids other than tin and silicon. For example, the silicon tin oxide film can optionally consist of, or consist essentially of, silicon tin oxide.

In some embodiments of the present group, the silicon tin oxide film will contain tin at a weight percent (on a metal/metalloid-only basis) of from 50 to 90 percent. In such embodiments, there preferably will be less silicon than tin in the silicon tin oxide film.

In some cases, the indium tin oxide film and the silicon tin oxide film of the present embodiment group will have thicknesses in the following ranges:

| | Thickness (angstroms) |
|---|---|
| ITO film | 1,050-1,850, preferably 1,100-1,650, such as 1,300 |
| Silicon tin oxide film | 100-900 preferably 200-800, such as 500 |

In such cases, the coating 7 preferably is devoid of a metal film, or at least does not include any silver film, as noted above. In addition, the indium tin oxide film preferably is a suboxide while the silicon tin oxide film is fully oxidized. Furthermore, the silicon tin oxide film can optionally contain tin at a weight percent (on a metal/metalloid-only basis) of from 50 to 90 percent.

In yet another group of embodiments, the alloy oxide overcoat film 100' comprises zinc tin oxide (e.g., is a zinc tin oxide film). In such cases, the alloy oxide overcoat film 100' can comprise any zinc tin oxide composition. Thus, the coating 7 can include both an indium tin oxide film 20 and a zinc tin oxide film. The zinc tin oxide film is located over, and preferably is in contact with, the indium tin oxide film 20. Preferably, the zinc tin oxide film contains both oxidized zinc and oxidized tin. In some such embodiments, the zinc tin oxide film is devoid of metals other than zinc and tin. For example, the zinc tin oxide film can optionally consist of, or consist essentially of, zinc tin oxide.

In some embodiments of the present group, the zinc tin oxide film will contain tin at a weight percent (on a metal-only basis) of from 30 to 50 percent. In such embodiments, there preferably will be less tin than zinc in the zinc tin oxide film.

In some cases, the indium tin oxide film and the zinc tin oxide film of the present embodiment group will have thicknesses in the following ranges:

| | Thickness (angstroms) |
|---|---|
| ITO film | 1,050-1,850, preferably 1,100-1,650, such as 1,300 |
| Zinc tin oxide film | 100-900 preferably 200-800, such as 500 |

In such cases, the coating 7 preferably is devoid of a metal film, or at least does not include any silver film, as noted above. In addition, the indium tin oxide film preferably is a suboxide while the zinc tin oxide film is fully oxidized. Furthermore, the zinc tin oxide film can optionally contain tin at a weight percent (on a metal-only basis) of from 30 to 50 percent.

Following are descriptions of methods for depositing various embodiments of the present coating 7. These methods do not reflect working examples that have been made and tested, but rather are provided as examples of methods which Applicant predicts can be used to make various embodiments of coating 7.

Following is a non-limiting method for depositing one embodiment of the present coating 7 onto a glass substrate. A pair of rotatable ceramic ITO targets, sub-oxide ceramic ITO targets, or metallic indium-tin targets is sputtered in an atmosphere of argon and oxygen while an uncoated glass substrate is conveyed past the activated targets. In this example, the relative weight amounts of the two metals in the sputterable target material is: indium 90%, tin 10%. The resulting indium tin oxide film is deposited so as to have a thickness of about 1,300 Å and a sheet resistance of about 60 ohms per square. Directly over this first ITO film, a second ITO film is applied by sputtering targets of the same composition (i.e., the same composition as those described above for the first ITO film) in an atmosphere of argon and oxygen. However, the targets used to deposit the second ITO film are sputtered in an atmosphere having a different amount of oxygen (e.g., more oxygen) than the atmosphere used to deposit the first ITO film. The resulting second ITO film is deposited so as to have a thickness of about 800 Å and a sheet resistance of about 200 ohms per square. A desired heat treatment selected from a variety of known, conventional TCO heat treatment processes is then performed so as to bring the sheet resistance of the first ITO film to about 12.5 ohms per square.

Following is another non-limiting method for depositing certain embodiments of the present coating 7 onto a glass substrate. A pair of rotatable ceramic ITO targets, sub-oxide ceramic ITO targets, or metallic indium-tin targets is sputtered in an atmosphere of argon and oxygen while an uncoated glass substrate is conveyed past the activated targets. In this example, the relative weight amounts of the two metals in the sputterable target material is: indium 90%, tin 10%. The resulting indium tin oxide film is deposited so as to have a thickness of about 1,300 Å and a sheet resistance of about 60 ohms per square. Directly over this ITO film, an aluminum tin oxide film is applied by sputtering metallic aluminum tin targets in an atmosphere of argon and oxygen. In this example, the relative weight amounts of the two metals in the sputterable target material is: 50% tin; 50% aluminum. Useful aluminum tin targets can be obtained commercially from Soleras Advanced Coatings of Deinze, Belgium, or from Materion Advanced Material Group of Buffalo, N.Y., USA, or from other well-known commercial target suppliers. The resulting aluminum tin oxide film is deposited so as to have a thickness of about 500 Å. A desired heat treatment selected from a variety of known, conventional TCO heat treatment processes is then performed so as to bring the sheet resistance of the ITO film to about 12.5 ohms per square.

Following is still another non-limiting method for depositing certain embodiments of the present coating 7 onto a glass substrate. A pair of rotatable ceramic ITO targets, or sub-oxide ceramic ITO targets, or metallic indium-tin targets is sputtered in an atmosphere of argon and oxygen while an uncoated glass substrate is conveyed past the activated targets. In this example, the relative weight amounts of the two metals in the sputterable target material is: indium 90%, tin 10%. The resulting indium tin oxide film is deposited so as to have a thickness of about 1,300 Å and a sheet resistance of about 60 ohms per square. Directly over this ITO film, a silicon tin oxide film is applied by sputtering elemental/metallic silicon tin targets in an atmosphere of argon and oxygen. In this example, the relative weight amounts of the tin and silicon in the sputterable target material is: 50-90% tin; 10-50% silicon. Useful silicon tin targets can be obtained commercially from Soleras Advanced Coatings of Deinze, Belgium, or from Materion Advanced Material Group of Buffalo, N.Y., USA, or from other well-known commercial target suppliers. The resulting silicon tin oxide film is deposited so as to have a thickness of about 500 Å. A desired heat treatment selected from a variety of known, conventional TCO heat treatment processes is then performed so as to bring the sheet resistance of the ITO film to about 12.5 ohms per square.

Following is yet another non-limiting method for depositing certain embodiments of the present coating 7 onto a glass substrate. A pair of rotatable ceramic ITO targets, or sub-oxide ceramic ITO targets, or metallic indium-tin targets is sputtered in an atmosphere of argon and oxygen while an uncoated glass substrate is conveyed past the activated targets. In this example, the relative weight amounts of the two metals in the sputterable target material is: indium 90%, tin 10%. The resulting indium tin oxide film is deposited so as to have a thickness of about 1,300 Å and a sheet resistance of about 60 ohms per square. Directly over this ITO film, a zinc tin oxide film is applied by sputtering a pair of targets comprising a compound of zinc and tin in an oxidizing atmosphere while an uncoated glass substrate is conveyed past the activated targets. The oxidizing atmosphere can consist essentially of oxygen (e.g., about 100% $O_2$) at a pressure of about $4\times10^{-3}$ mbar. Alternatively, this atmosphere may comprise argon and oxygen. In this example, the relative weight amounts of the two metals in the sputterable material of the targets is: zinc 50%; tin 50%. The resulting zinc tin oxide film is deposited so as to have a thickness of about 500 Å. A desired heat treatment selected from a variety of known, conventional TCO heat treatment processes is then performed so as to bring the sheet resistance of the ITO film to about 12.5 ohms per square.

While some preferred embodiments of the invention have been described, it should be understood that various changes, adaptations and modifications may be made therein without departing from the spirit of the invention and the scope of the appended claims.

What is claimed is:

1. A multiple-pane insulating glazing unit having a between-pane space and two opposed external pane surfaces, a desired one of the two external pane surfaces bearing a coating comprising both a first indium tin oxide film and a second indium tin oxide film, the second indium tin oxide film being located over the first indium tin oxide film, the second indium tin oxide film being in contact with the first indium tin oxide film, the first indium tin oxide film being more electrically conductive than the second indium tin oxide film.

2. The multiple-pane insulating glazing unit of claim 1 wherein the first indium tin oxide film has substantially the same amount of indium and tin as the second indium tin oxide film.

3. The multiple-pane insulating glazing unit of claim 1 wherein the second indium tin oxide film is an exposed outermost film of the coating.

4. The multiple-pane insulating glazing unit of claim 1 wherein the coating is devoid of a metal layer.

5. The multiple-pane insulating glazing unit of claim 1 wherein the first and second indium tin oxide films each consist of indium tin oxide.

6. The multiple-pane insulating glazing unit of claim 1 wherein a thickness of the second indium tin oxide film is between 400 angstroms and 1,200 angstroms, and wherein a thickness of the first indium tin oxide film is between 900 angstroms and 2,000 angstroms.

7. The multiple-pane insulating glazing unit of claim 1, wherein the coating has a total thickness of less than 2,400 angstroms.

8. The multiple-pane insulating glazing unit of claim 1 wherein the first indium tin oxide film is a suboxide and the second indium tin oxide film is stoichiometric.

9. The multiple-pane insulating glazing unit of claim 1 wherein both the first and second indium tin oxide films are suboxides, and the second indium tin oxide film is more oxidized than the first indium tin oxide film.

10. A coated pane comprising a glass substrate and a coating on the glass substrate, the coating comprising both a first indium tin oxide film and a second indium tin oxide film, the second indium tin oxide film being located over the first indium tin oxide film, the second indium tin oxide film being in contact with the first indium tin oxide film, the first indium tin oxide film being more electrically conductive than the second indium tin oxide film, wherein the first indium tin oxide film has a thickness of greater than 1,000 angstroms, and the second indium tin oxide film has a thickness of less than 1,000 angstroms.

11. The coated pane of claim 10 wherein the first indium tin oxide film has substantially the same amount of indium and tin as the second indium tin oxide film.

12. The coated pane of claim 10 wherein the second indium tin oxide film is an exposed outermost film of the coating.

13. The coated pane of claim 10 wherein the coating is devoid of a silver layer.

14. The coated pane of claim 10 wherein the first and second indium tin oxide films each consist of indium tin oxide.

15. The coated pane of claim 10 wherein the thickness of the second indium tin oxide film is from 500 angstroms to 900 angstroms.

16. The coated pane of claim 15 wherein the thickness of the first indium tin oxide film is from 1,100 angstroms and 1,650 angstroms.

17. The coated pane of claim 10 wherein the first indium tin oxide film is a suboxide and the second indium tin oxide film is stoichiometric.

18. The coated pane of claim 10 wherein both the first and second indium tin oxide films are suboxides, and the second indium tin oxide film is more oxidized than the first indium tin oxide film.

19. A multiple-pane insulating glazing unit having a between-pane space and two opposed external pane surfaces, a desired one of the two external pane surfaces bearing a coating comprising both a first indium tin oxide film and a second indium tin oxide film, wherein the first and second indium tin oxide films are the only indium tin oxide films in the coating, the second indium tin oxide film being located over the first indium tin oxide film, the second indium tin oxide film being in contact with the first indium tin oxide film, the first indium tin oxide film being more electrically conductive than the second indium tin oxide film.

20. The multiple-pane insulating glazing unit of claim 19 wherein the first indium tin oxide film has substantially the same amount of indium and tin as the second indium tin oxide film.

21. The multiple-pane insulating glazing unit of claim 19 wherein the second indium tin oxide film is an exposed outermost film of the coating.

22. The multiple-pane insulating glazing unit of claim 19 wherein the coating is devoid of a metal layer.

23. The multiple-pane insulating glazing unit of claim 19 wherein the first indium tin oxide film has a sheet resistance of less than 15 ohms/square, and the second indium tin oxide film has a sheet resistance of greater than 100 ohms/square.

24. The multiple-pane insulating glazing unit of claim 23 wherein the sheet resistance of the second indium tin oxide film is between 150 ohms/square and 400 ohms/square.

25. The multiple-pane insulating glazing unit of claim 19 wherein a thickness of the first indium tin oxide film is between 900 angstroms and 2,000 angstroms, and a thickness of the second indium tin oxide film is between 400 angstroms and 1,200 angstroms.

26. The multiple-pane insulating glazing unit of claim 19 wherein the first indium tin oxide film is a suboxide and the second indium tin oxide film is stoichiometric.

27. The multiple-pane insulating glazing unit of claim 19 wherein both the first and second indium tin oxide films are suboxides, and the second indium tin oxide film is more oxidized than the first indium tin oxide film.

28. A multiple-pane insulating glazing unit having a between-pane space and two opposed external pane surfaces, a desired one of the two external pane surfaces bearing a coating comprising both a first indium tin oxide film and a second indium tin oxide film, the second indium tin oxide film being located over the first indium tin oxide film, wherein the first indium tin oxide film has substantially the same amounts of indium and tin as the second indium tin oxide film, the second indium tin oxide film being in contact with the first indium tin oxide film, the first indium tin oxide film being more electrically conductive than the second indium tin oxide film, wherein a thickness of the first indium tin oxide film is between 500 angstroms and 2,000 angstroms, and a thickness of the second indium tin oxide film is between 200 angstroms and 1,350 angstroms.

29. The multiple-pane insulating glazing unit of claim 28 wherein the coating has a total thickness of less than 2,400 angstroms.

30. The multiple-pane insulating glazing unit of claim 28 wherein the thickness of the first indium tin oxide film is from 1,200 angstroms to 1,750 angstroms.

31. The multiple-pane insulating glazing unit of claim 28 wherein the first indium tin oxide film has the same amounts of indium and tin as the second indium tin oxide film.

32. The multiple-pane insulating glazing unit of claim 28 wherein the coating does not include a third indium tin oxide film.

33. The multiple-pane insulating glazing unit of claim 28 further including a base film comprising silicon dioxide, silicon nitride, or silicon oxynitride, the first indium tin oxide film being in contact with the base film comprising silicon oxide, silicon nitride, or silicon oxynitride.

34. The multiple-pane insulating glazing unit of claim 28 further including a film comprising silicon nitride, silicon oxynitride, silicon oxide, or titanium oxide over the second indium tin oxide film.

35. The multiple-pane insulating glazing unit of claim 28 wherein the first indium tin oxide film has a sheet resistance of less than 25 ohms per square, and the second indium tin oxide film has a sheet resistance of greater than 100 ohms per square.

36. The coated pane of claim 10 further including a film comprising silicon nitride, silicon oxynitride, silicon oxide, or titanium oxide over the second indium tin oxide film.

37. The coated pane of claim 10 further including a base film comprising silicon dioxide, silicon nitride, or silicon oxynitride, the first indium tin oxide film being in contact with the base film comprising silicon oxide, silicon nitride, or silicon oxynitride.

38. The coated pane of claim 10 wherein the first indium tin oxide film has a sheet resistance of less than 25 ohms per square, and the second indium tin oxide film has a sheet resistance of greater than 100 ohms per square.

* * * * *